(12) United States Patent
DiRisio

(10) Patent No.: US 6,860,653 B2
(45) Date of Patent: Mar. 1, 2005

(54) CAMERA ASSEMBLY HAVING OVER-CENTER BIASING OF TRAVELER AGAINST RESTS

(75) Inventor: Anthony DiRisio, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/447,702

(22) Filed: May 29, 2003

(65) Prior Publication Data

US 2004/0240874 A1 Dec. 2, 2004

(51) Int. Cl.[7] .......................... G03B 17/04; G02B 7/04; G02B 15/14
(52) U.S. Cl. .................. 396/349; 396/144; 359/694
(58) Field of Search ........................ 396/6, 138, 144, 396/343, 348, 349; 359/694

(56) References Cited

U.S. PATENT DOCUMENTS

| 3,220,308 A | 11/1965 | Lareau |
| 4,725,864 A | 2/1988 | Ogawa et al. |
| 4,771,303 A | 9/1988 | Matsumoto et al. |
| 5,289,320 A | 2/1994 | Kobayashi |
| 5,613,168 A | 3/1997 | Kawano et al. |
| 6,072,639 A * | 6/2000 | Onda .......................... 359/694 |
| 6,466,740 B1 | 10/2002 | Yoshida et al. |
| 6,621,988 B2 * | 9/2003 | Takagi ......................... 396/287 |

* cited by examiner

*Primary Examiner*—Judy Nguyen
*Assistant Examiner*—Arthur A Smith
(74) *Attorney, Agent, or Firm*—Robert Luke Walker

(57) ABSTRACT

A cam era assembly has a support that defines an optical axis. A traveler is reversibly movable along the optical axis, relative to the support, from a retracted position, through a plurality of intermediate positions, to an extended position. The traveler has opposed first and second contact surfaces. A guide extends outward from the support. The guide has a forward rest that faces the first contact surface and a rear rest that faces the second contact surface. The rests are each aligned with the optical axis. A biaser biases the traveler against the rear rest, when said traveler is in the retracted position, and against the forward rest, when the traveler is in the extended position. The biaser is spaced from the rests and the contact surfaces.

29 Claims, 39 Drawing Sheets

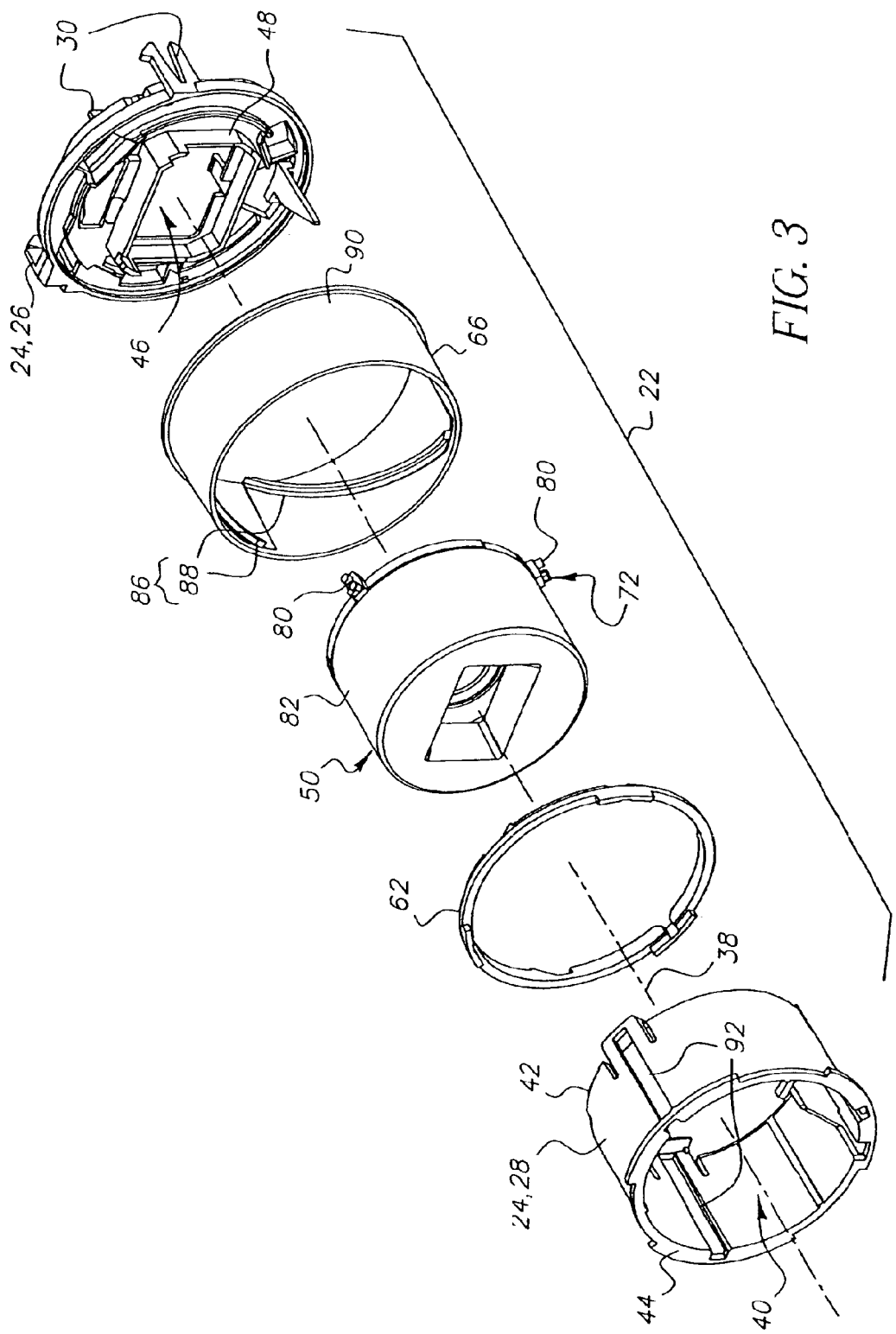

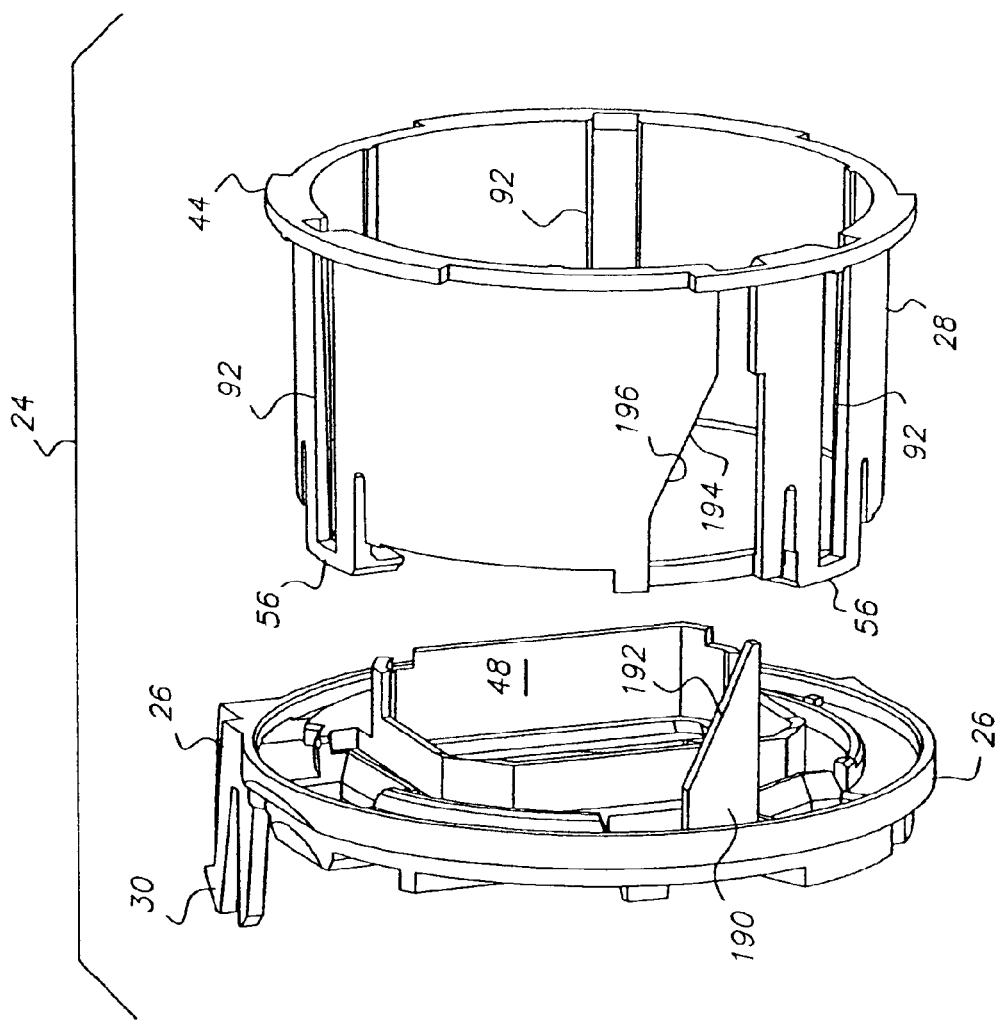

CAMERA ASSEMBLY HAVING OVER-CENTER BIASING OF TRAVELER AGAINST RESTS

CROSS REFERENCE TO RELATED APPLICATIONS

Reference is made to commonly assigned, co-pending U.S. Pat. No. 6,711,349, entitled: CAMERA ASSEMBLY HAVING A TRAVELER AND PIVOTABLE TURRET DRIVEN BY AN OVER-CENTER MECHANISM, granted Mar. 23, 2004, in the name of Anthony DiRisio, which is hereby incorporated herein by reference.

Reference is made to commonly assigned, co-pending U.S. Pat. No. 6,751,411, entitled: CAMERA ASSEMBLY HAVING TRAVEL STOP, granted Jun. 15, 2004, in the name of Anthony DiRisio, which is hereby incorporated herein by reference.

Reference is made to commonly assigned, co-pending U.S. patent application Ser. No. 6,757,490, entitled: CAMERA ASSEMBLY HAVING FORWARD AND RETURN CAM SURFACES FOR A TURRET ON DIFFERENT PARTS, granted Jun. 29, 2004, in the name of Anthony DiRisio, which is hereby incorporated herein by reference.

Reference is made to commonly assigned, co-pending U.S. patent application Ser. No. 10/447,701, entitled: CAMERA ASSEMBLY HAVING COVERGLASS-LENS ADJUSTER, filed May 29, 2003, in the name of Wayne Stiehler, which is hereby incorporated herein by reference.

Reference is made to commonly assigned, co-pending U.S. patent application Ser. No. 10,447,853, entitled: DEPLOYMENT APPARATUS FOR CAMERAS AND OTHER HAND-HELD DEVICES AND DEPLOYMENT METHOD, filed May 29, 2003, in the name of Michael Roger Allen, Anthony DiRisio, which is hereby incorporated herein by reference.

Reference is also made to commonly assigned, co-pending U.S. patent application Ser. No. 10/264,757, entitled: MULTIPLE POSITION LENS BARREL HAVING CAM CYLINDER WITH COMMONLY BIASED FIRST AND SECOND LENS CARRIERS, filed Oct. 4, 2002, in the name of Anthony DiRisio.

Reference is also made to commonly assigned, co-pending U.S. patent application Ser. No. 10/324,488, entitled: CAMERA FRAME ASSEMBLY HAVING FOUR-BAR LINKAGE SHUTTER ACTUATOR, filed Dec. 20, 2002, in the name of Anthony DiRisio.

Reference is also made to commonly assigned, co-pending U.S. patent application Ser. No. 10/324,966, entitled: CAMERA LENS MODULE HAVING RECYCLABLE LENS BARREL CAP, filed Dec. 20, 2002, in the name of Anthony DiRisio.

Reference is also made to commonly assigned, co-pending U.S. patent application Ser. No. 10/327,503, entitled: EXTENDABLE LENS CAMERA HAVING MECHANICAL SHUTTER BLOCKING IN INTERMEDIATE LENS POSITION, filed Dec. 20, 2002, in the name of Anthony DiRisio.

Reference is also made to commonly assigned, co-pending U.S. patent application Ser. No. 10/325,507, entitled: CAMERA FRAME ASSEMBLY HAVING SHUTTER THAT SLIDES FORWARD AND BACK WITH ZOOM LENS, filed Dec. 20, 2002, in the name of Anthony DiRisio, David J. Cornell.

Reference is also made to commonly assigned, co-pending U.S. patent application Ser. No. 10/325,553, entitled: CAMERA FRAME ASSEMBLY HAVING SHUTTER ACTUATOR WITH TELESCOPING STRIKER AND METHOD, filed Dec. 20, 2002, in the name of David J. Cornell.

Reference is also made to commonly assigned, co-pending U.S. patent application Ser. No. 10/317,490, entitled: CAMERA FRONT SEAL ASSEMBLY, filed Dec. 12, 2002, in the name of Anthony DiRisio.

Reference is also made to commonly assigned, co-pending U.S. patent application Ser. No. 10,326,450, entitled: CAMERA FRAME ASSEMBLY HAVING INDEPENDENTLY BACK-PIVOTING DRIVE HUB FOR IMPACT SHUTTER, filed Dec. 20, 2002, in the name of Anthony DiRisio, David J. Cornell.

FIELD OF THE INVENTION

The invention relates to cameras and photography and more particularly relates to a camera assembly having a traveler that is over-center biased against optically aligned rests.

BACKGROUND OF THE INVENTION

Lens barrels of zoom lenses and continuously variable focus lens need to be accurately positioned on a continuous basis. This limits design approaches and can add cost and complexity. A two position lens requires accurate positioning in only those two positions. In-between positions are unimportant. U.S. Pat. No. 4,725,864 teaches a camera that can be limited to two focal lengths, but does not take advantage of this. The mechanism disclosed shows a lens system that is the same as for a continuously variable lens embodiment.

U.S. Pat. No. 6,466,740 teaches a one-time-use camera that is switchable between two focus positions. The camera has a lens holder that is continuously biased against a cam surface that closely resembles those of the continuously variable focusing mechanisms disclosed in U.S. Pat. Nos. 5,289,320; 5,613,168; and 3,220,308. The mechanism is relatively simple, but lacks some versatility, since the lens must rotate to follow a cam curve between positions.

It would thus be desirable to provide an improved camera assembly, in which a simple mechanism with a small number of parts provides lens positioning in two opposed positions.

SUMMARY OF THE INVENTION

The invention is defined by the claims. The invention, in broader aspects, provides a camera assembly having a support that defines an optical axis. A traveler is reversibly movable along the optical axis, relative to the support, from a retracted position, through a plurality of intermediate positions, to an extended position. The traveler has opposed first and second contact surfaces. A guide extends outward from the support. The guide has a forward rest that faces the first contact surface and a rear rest that faces the second contact surface. The rests are each aligned with the optical axis. A biaser biases the traveler against the rear rest, when said traveler is in the retracted position, and against the forward rest, when the traveler is in the extended position. The biaser is spaced from the rests and the contact surfaces.

It is an advantageous effect of the invention that an improved camera assembly, in which a simple mechanism with a small number of parts provides lens positioning in two opposed positions.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

Figure 1:
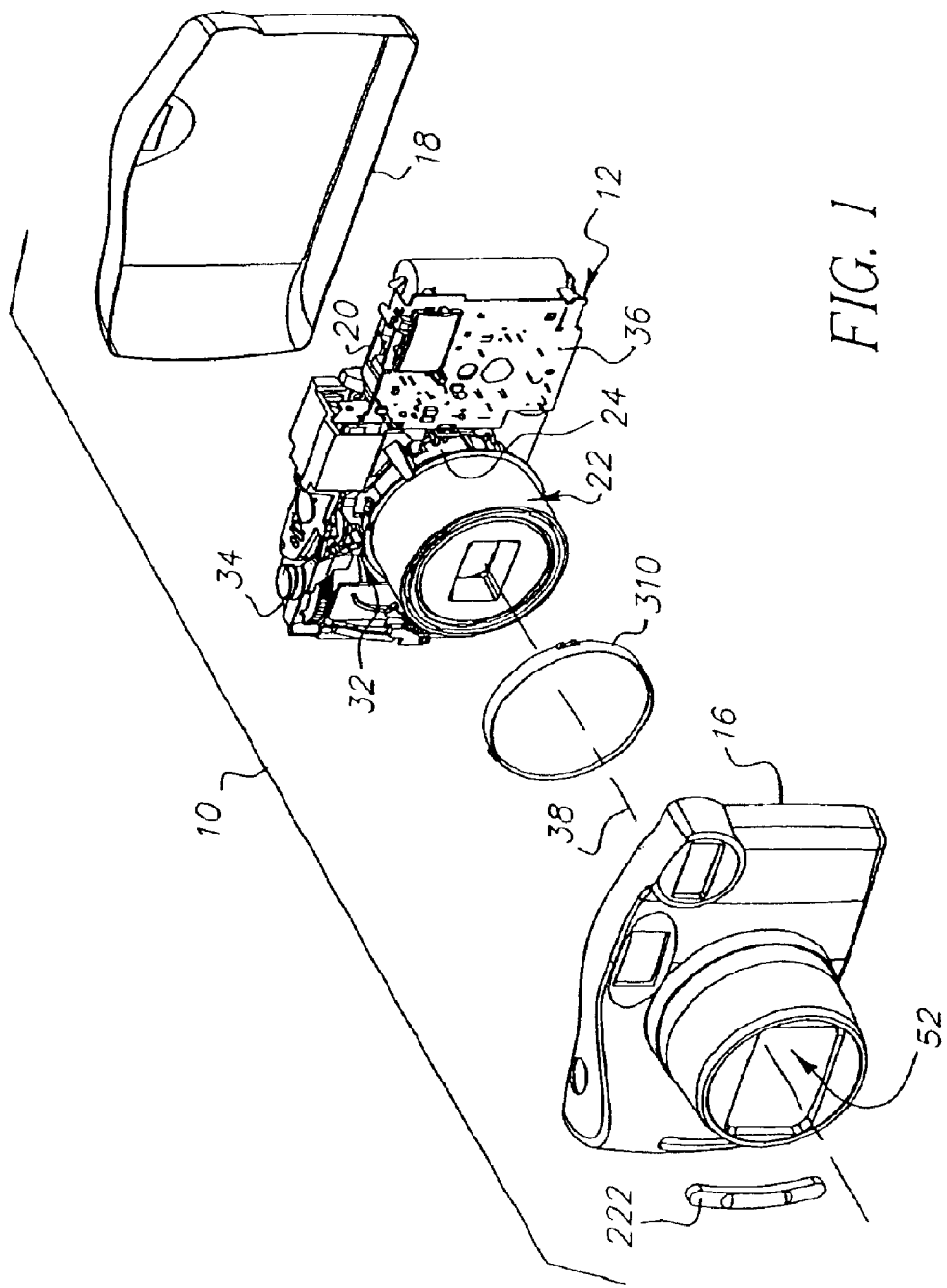
FIG. 1 is a partially exploded, front perspective view of an embodiment of the camera.
Figure 2:
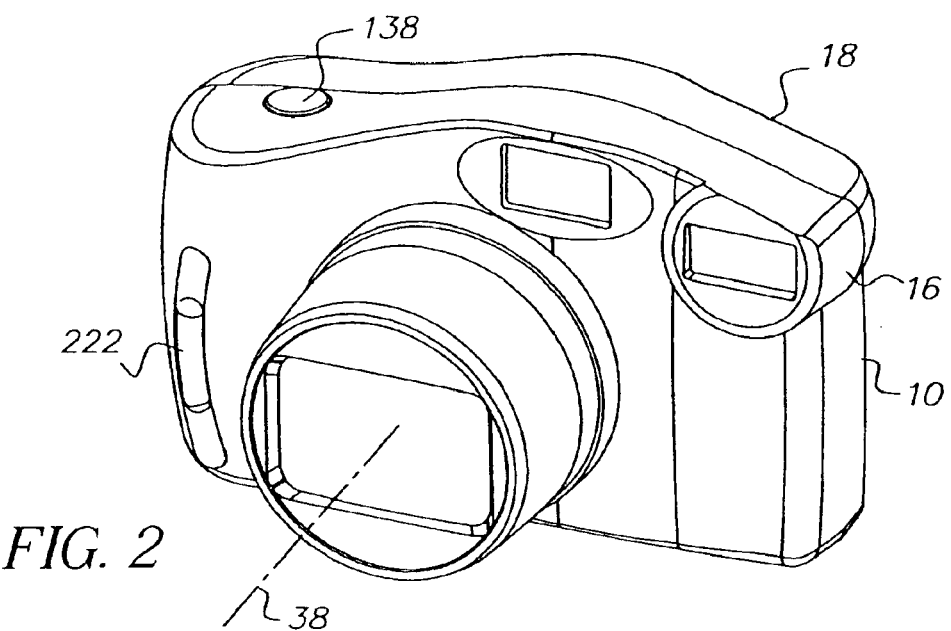
FIG. 2 is a front perspective view of the camera of FIG. 1.

Feature 3 is a partially exploded, front perspective view of the lens module of the camera of FIG. 1.

Figure 4:
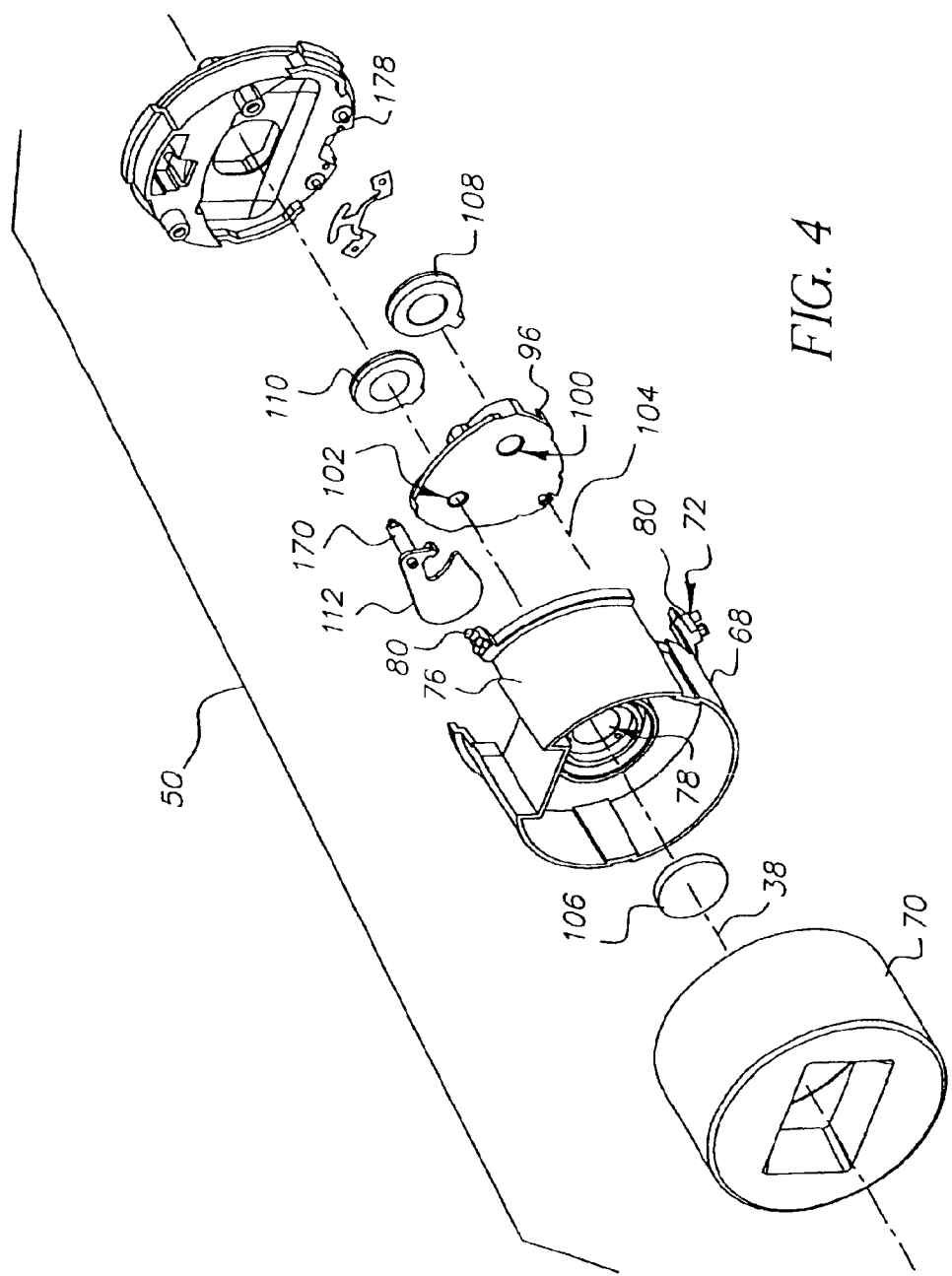

FIG. 4 is an exploded front perspective view of the lens barrel of the camera of FIG. 1.

Figure 5:
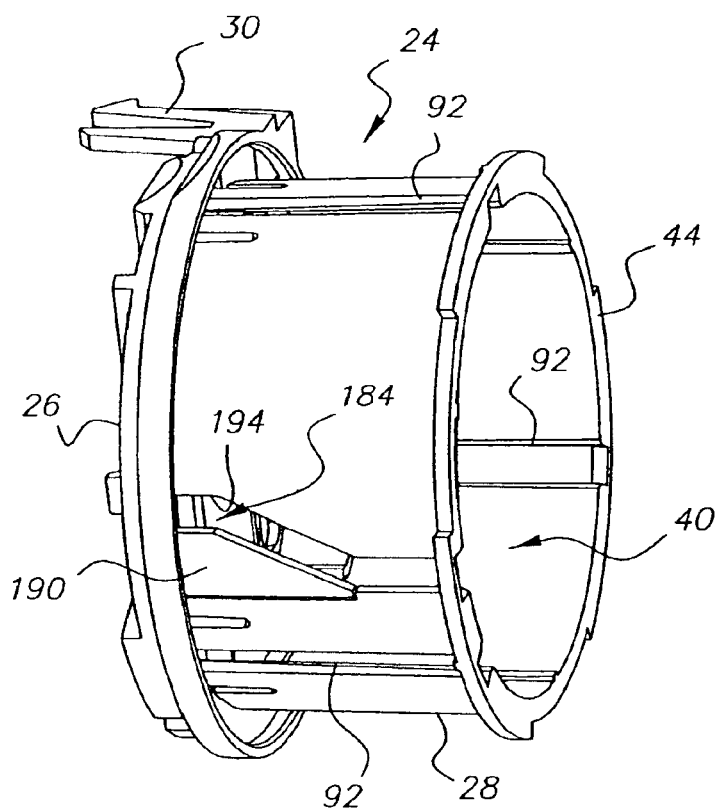

FIG. 5 is a perspective view of the support of the lens module of FIG. 3.

FIG. 6 is an exploded view of the support of FIG. 5.

Figure 7:
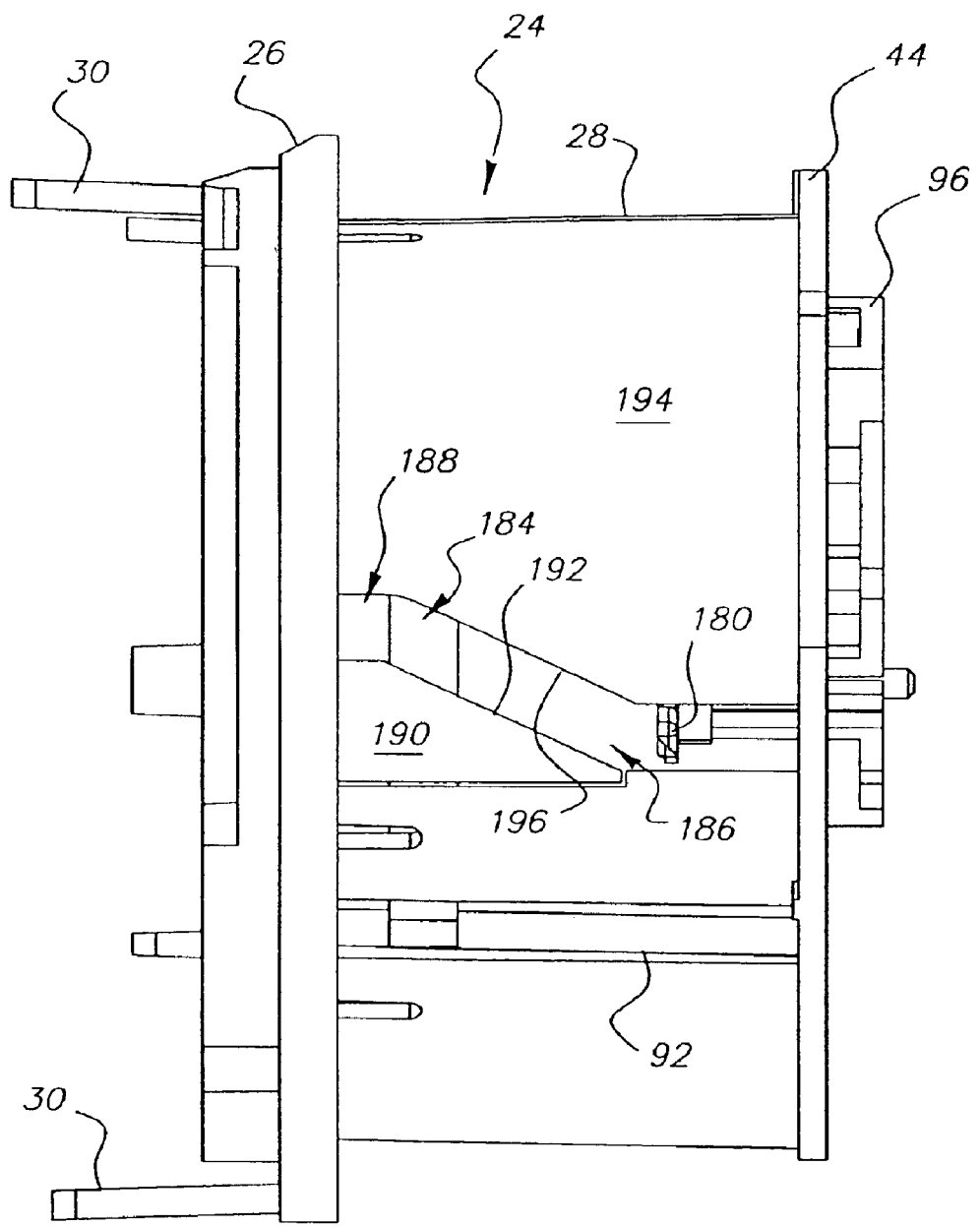

FIG. 7 is a side view of the support of FIG. 5. The turret is also shown.

Figure 8:
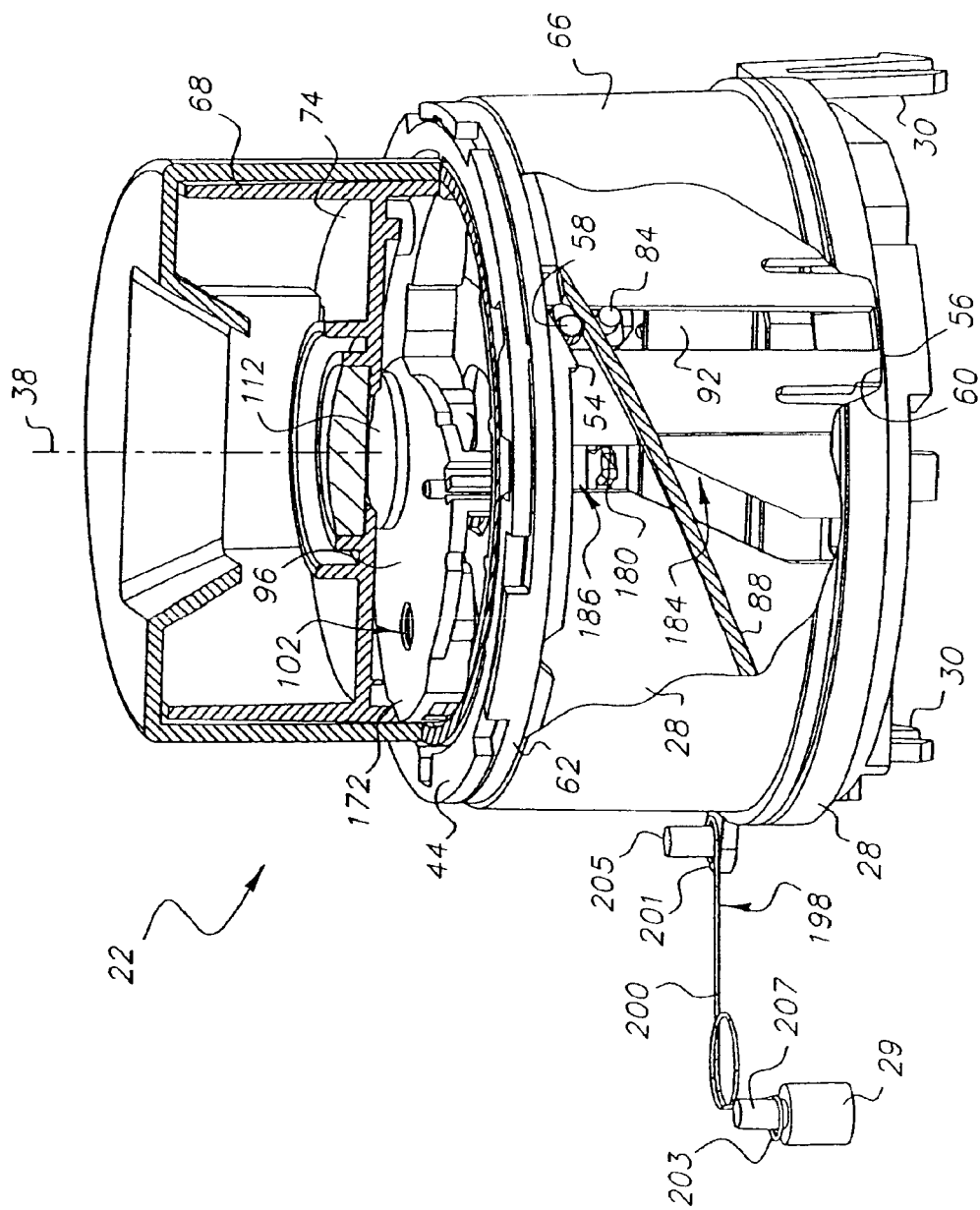

FIG. 8 is a partially cutaway, perspective view of the lens module of the camera of FIG. 1. The lens barrel is shown in an extended position. The turret is in a first position. The shutter is closed in FIGS. 8–10.

Figure 9:
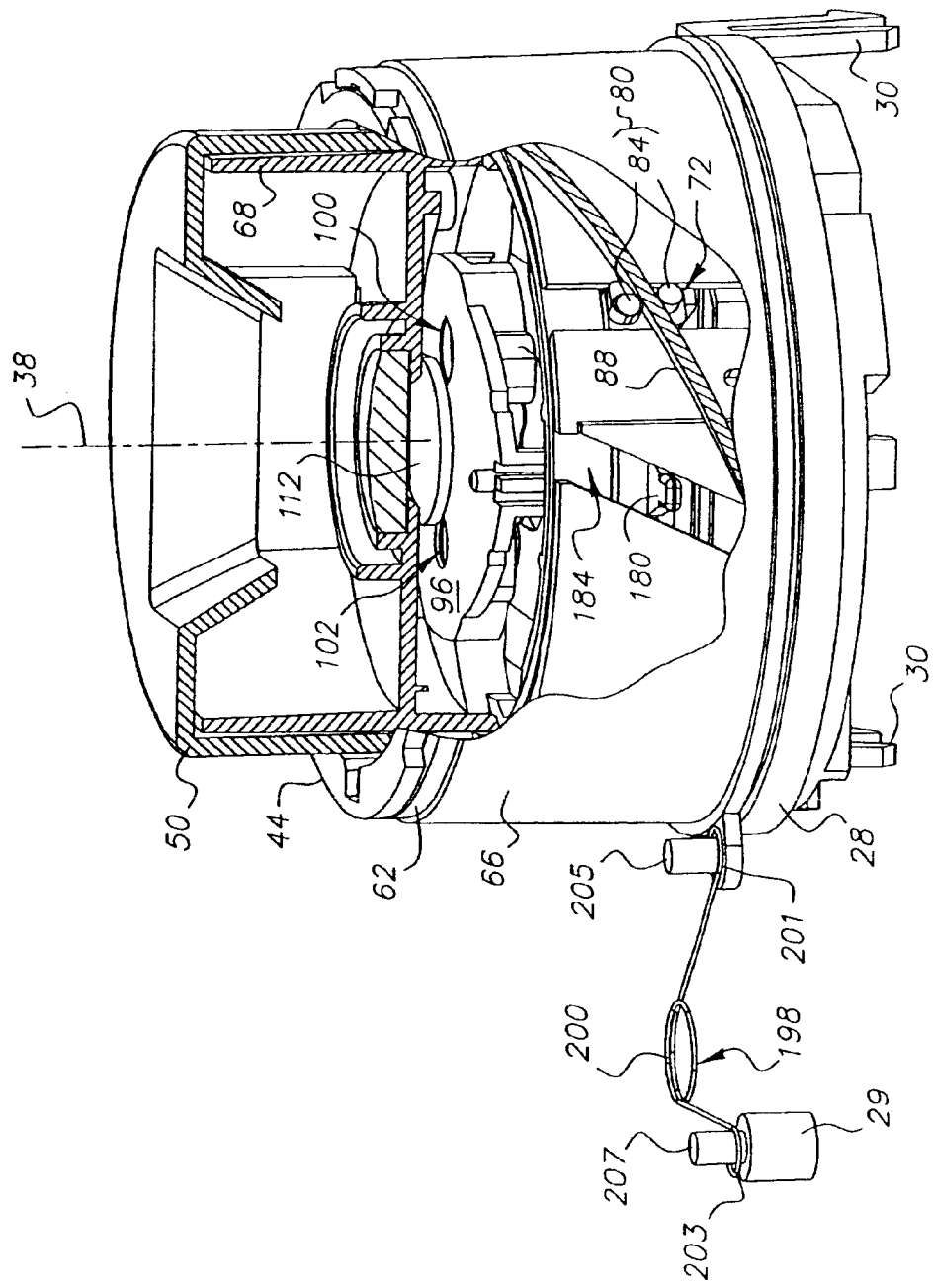

FIG. 9 is the same view as FIG. 8, but the lens barrel is shown in an intermediate position. The turret is in an intermediate position between the first and second positions.

Figure 10:
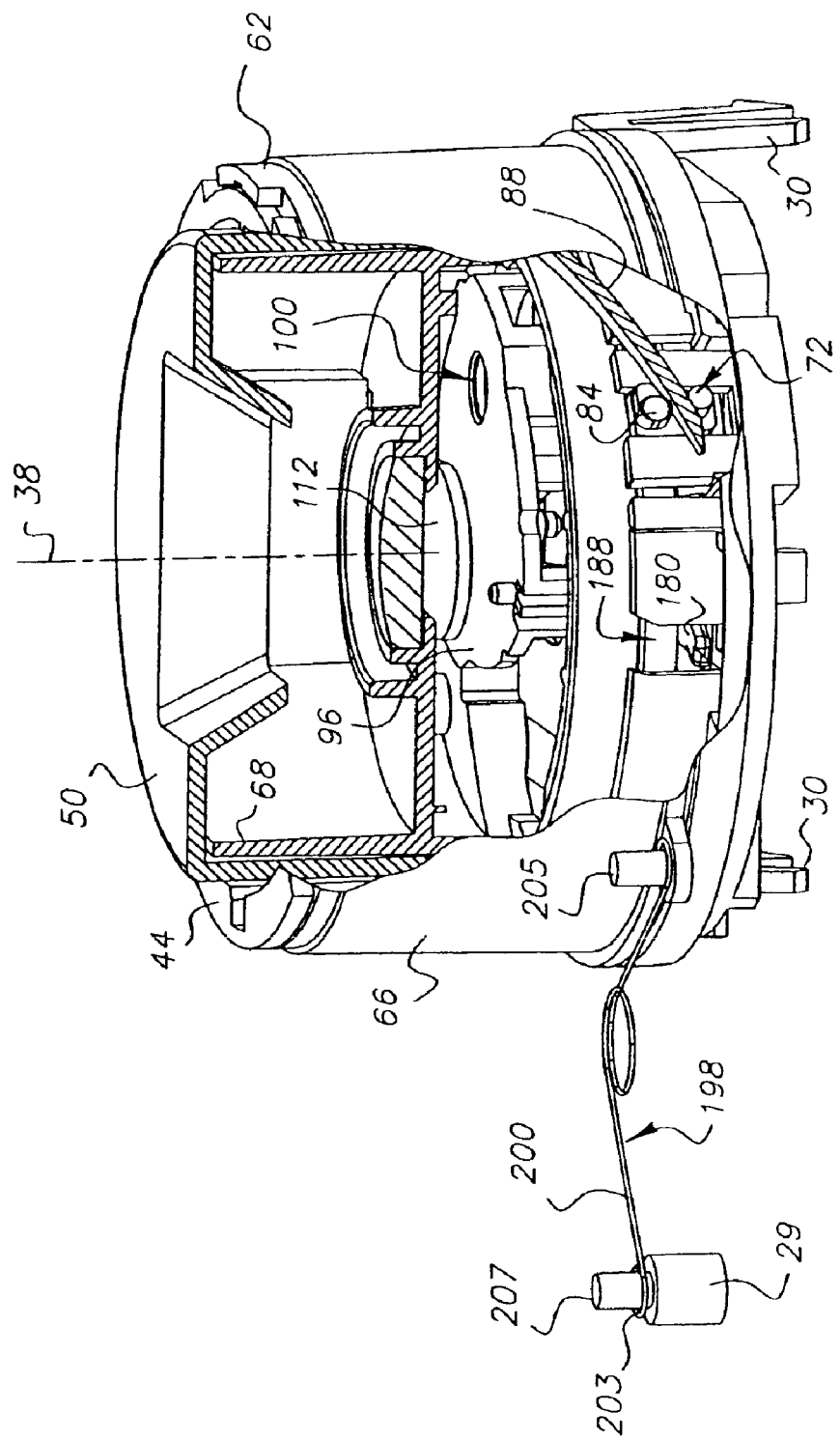

FIG. 10 is the same view as FIG. 8, but the lens barrel is shown in the retracted position and the turret is in the second position.

Figure 11:
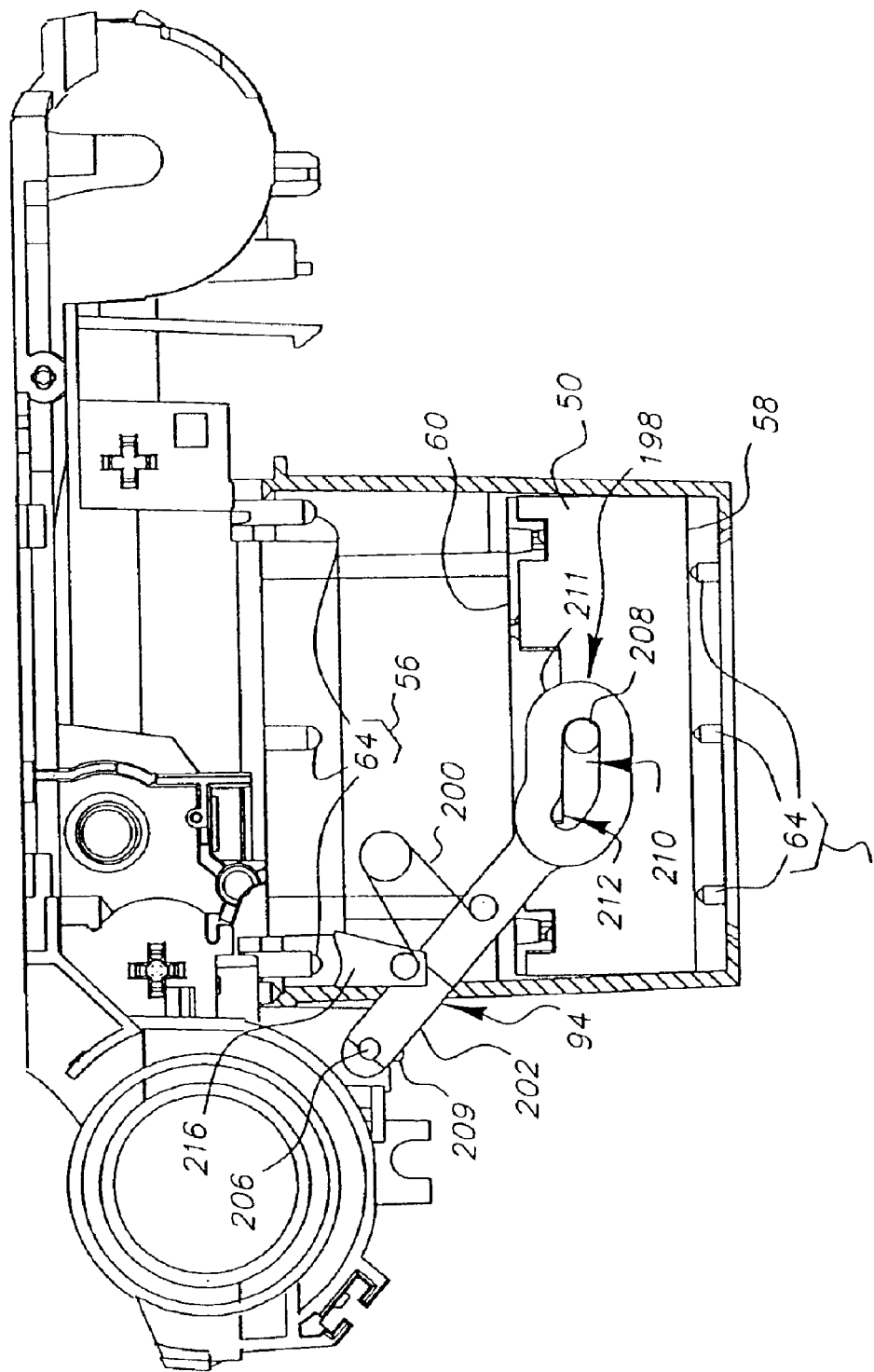

FIG. 11 is a semi-diagrammatical top view of another embodiment of the camera. The lens barrel is shown in an extended position.

Figure 12:
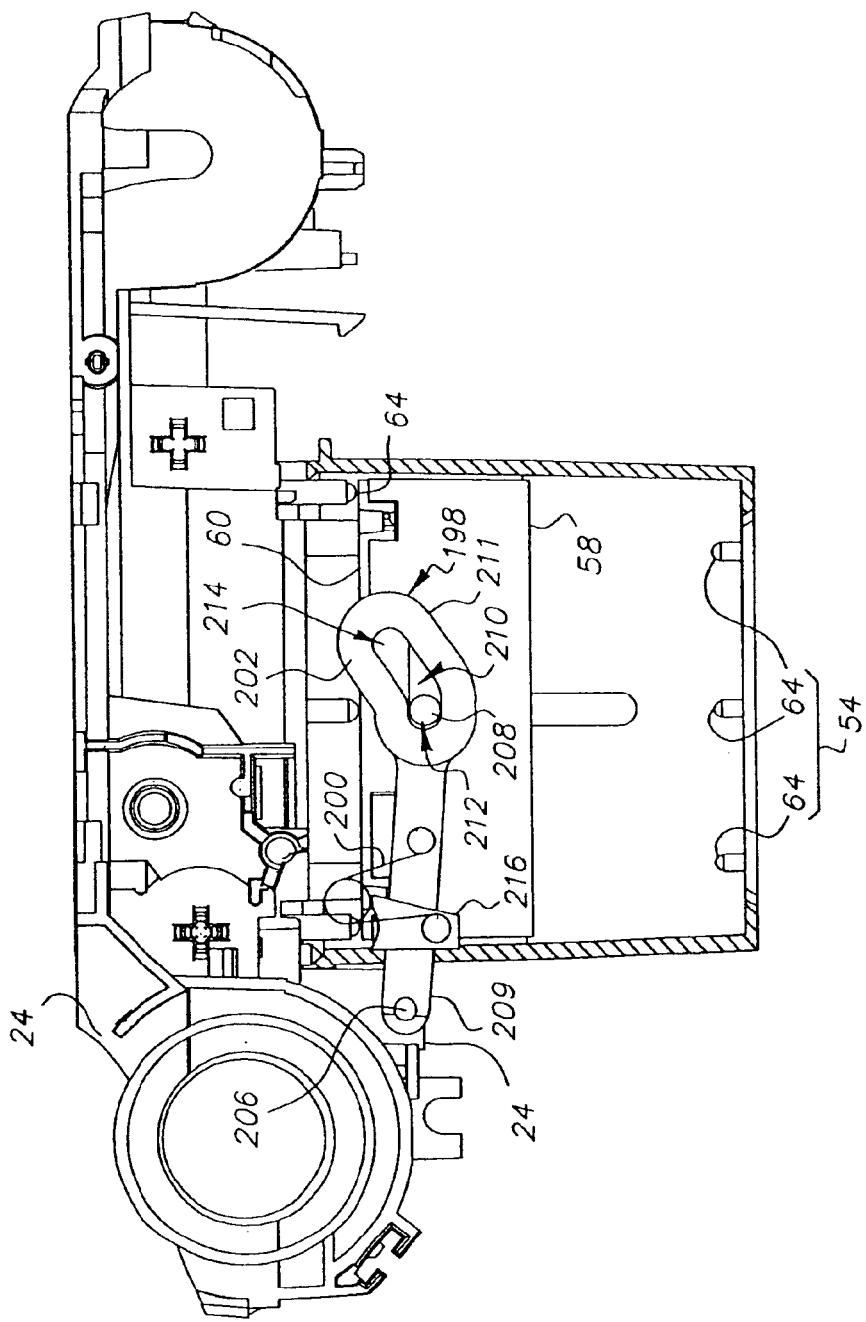

FIG. 12 is the same view as FIG. 11, but the lens barrel is shown in a retracted position.

Figure 13:
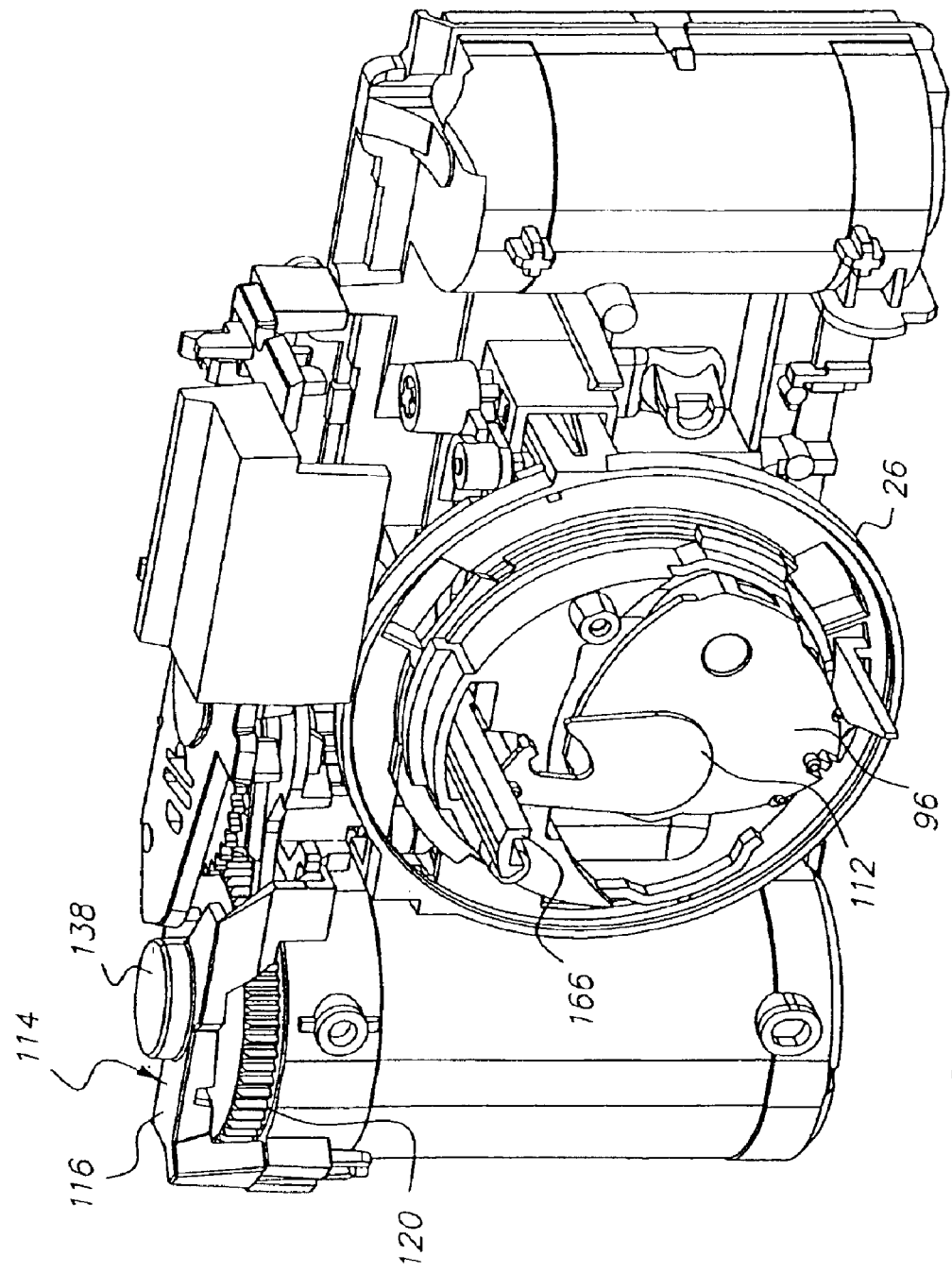

FIG. 13 is a perspective view of a frame assembly of FIG. 1. The frame assembly includes the frame, film transport, shutter, and turret. The shutter is in a closed position and the turret is in the second position.

Figure 14:
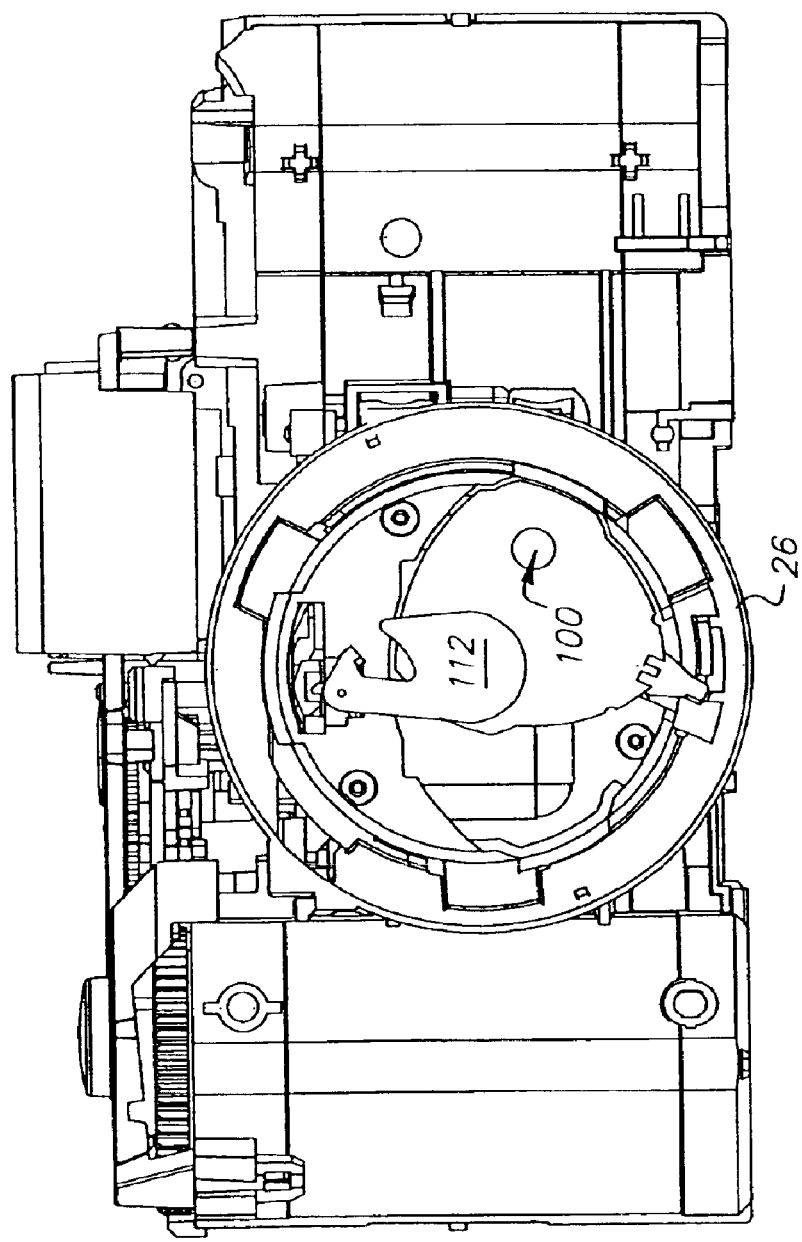

FIG. 14 is a partial front view of the frame assembly of FIG. 13.

Figure 15:
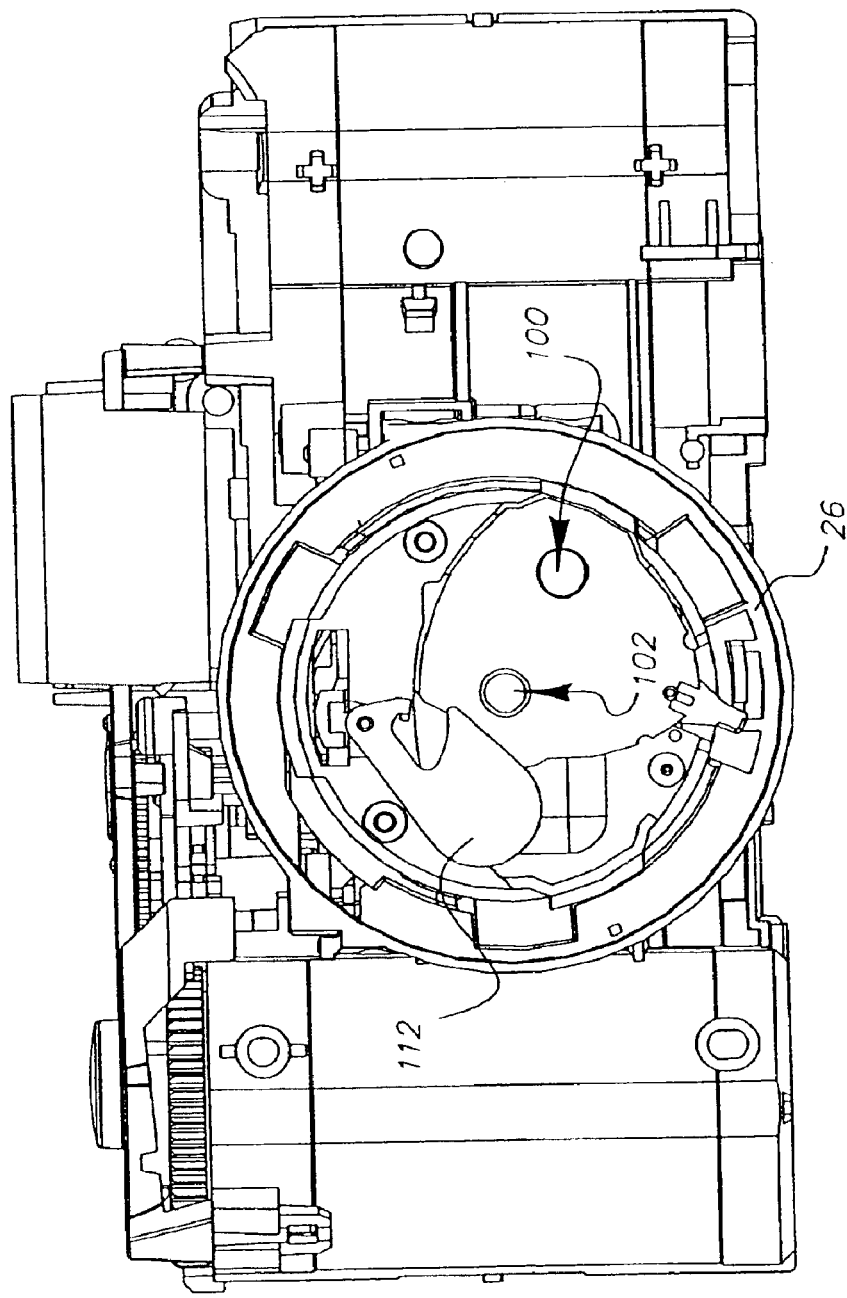

FIG. 15 is the same view as FIG. 14, but the shutter is in the open position.

Figure 16:
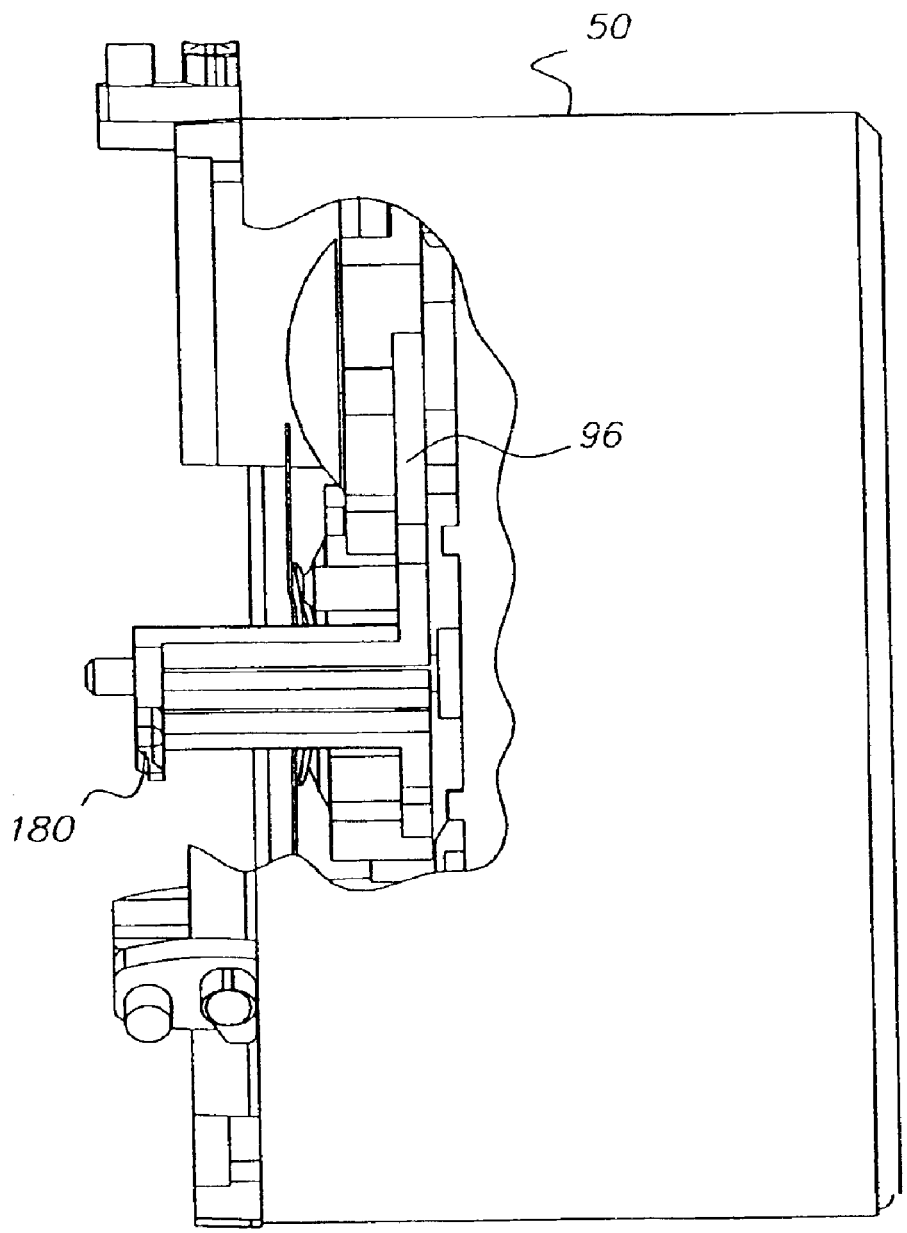

FIG. 16 is a partially cutaway side view of the lens barrel of the camera of FIG. 1.

Figure 17:
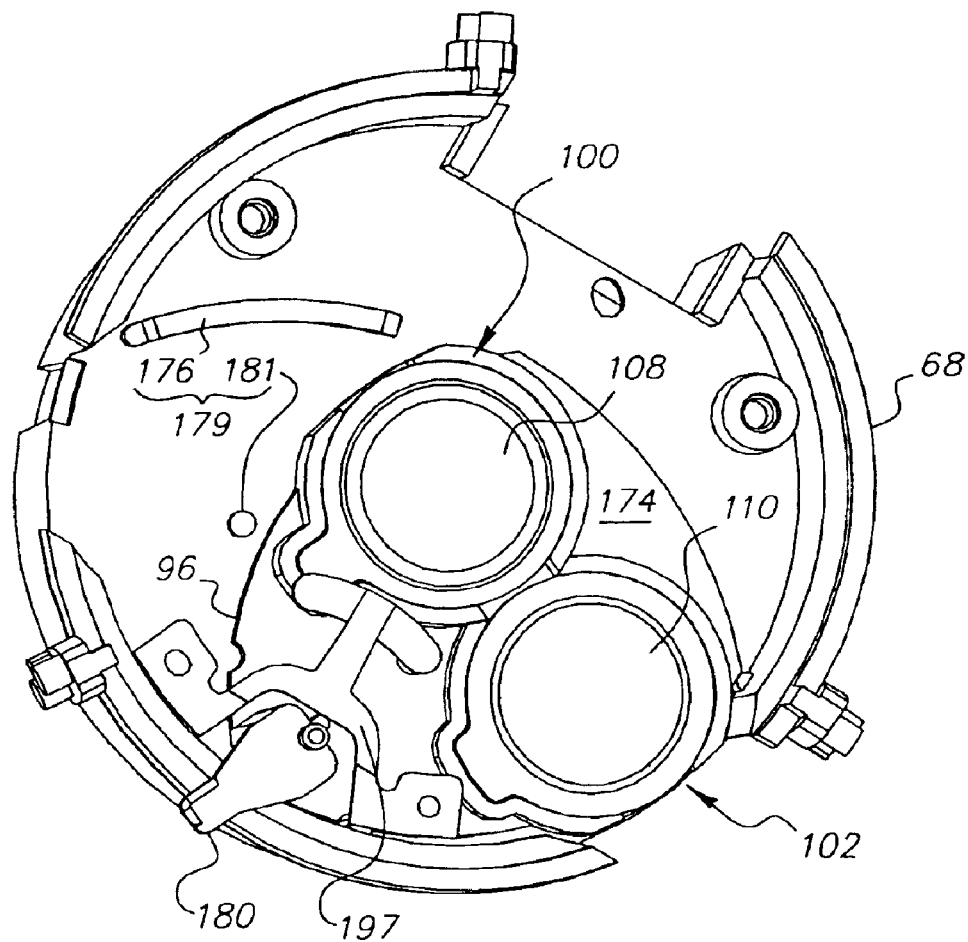

FIG. 17 is a rear perspective view of the lens barrel of the camera of FIG. 1. The backer is not shown. The turret is in the first position. The shutter is not shown in FIGS. 17–19.

Figure 18:
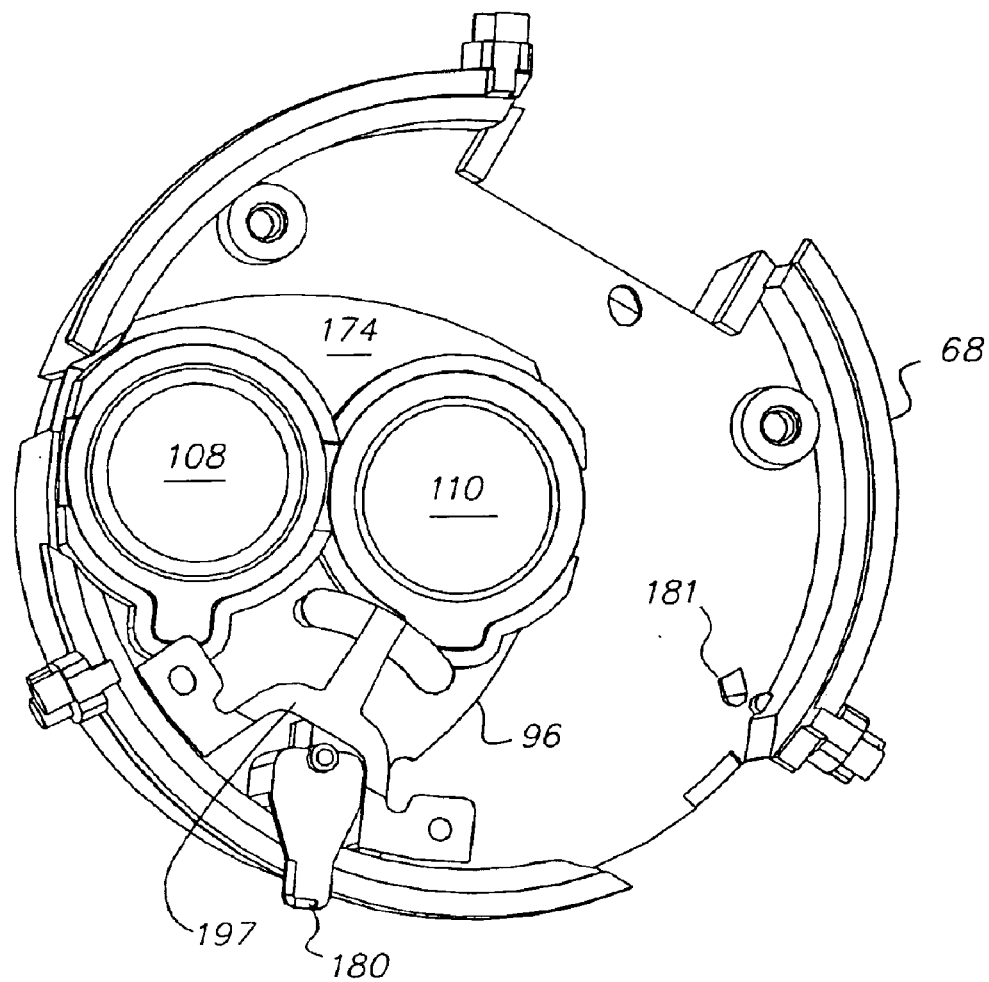

FIG. 18 is the same view as FIG. 17, but the turret is in the second position.

Figure 19:
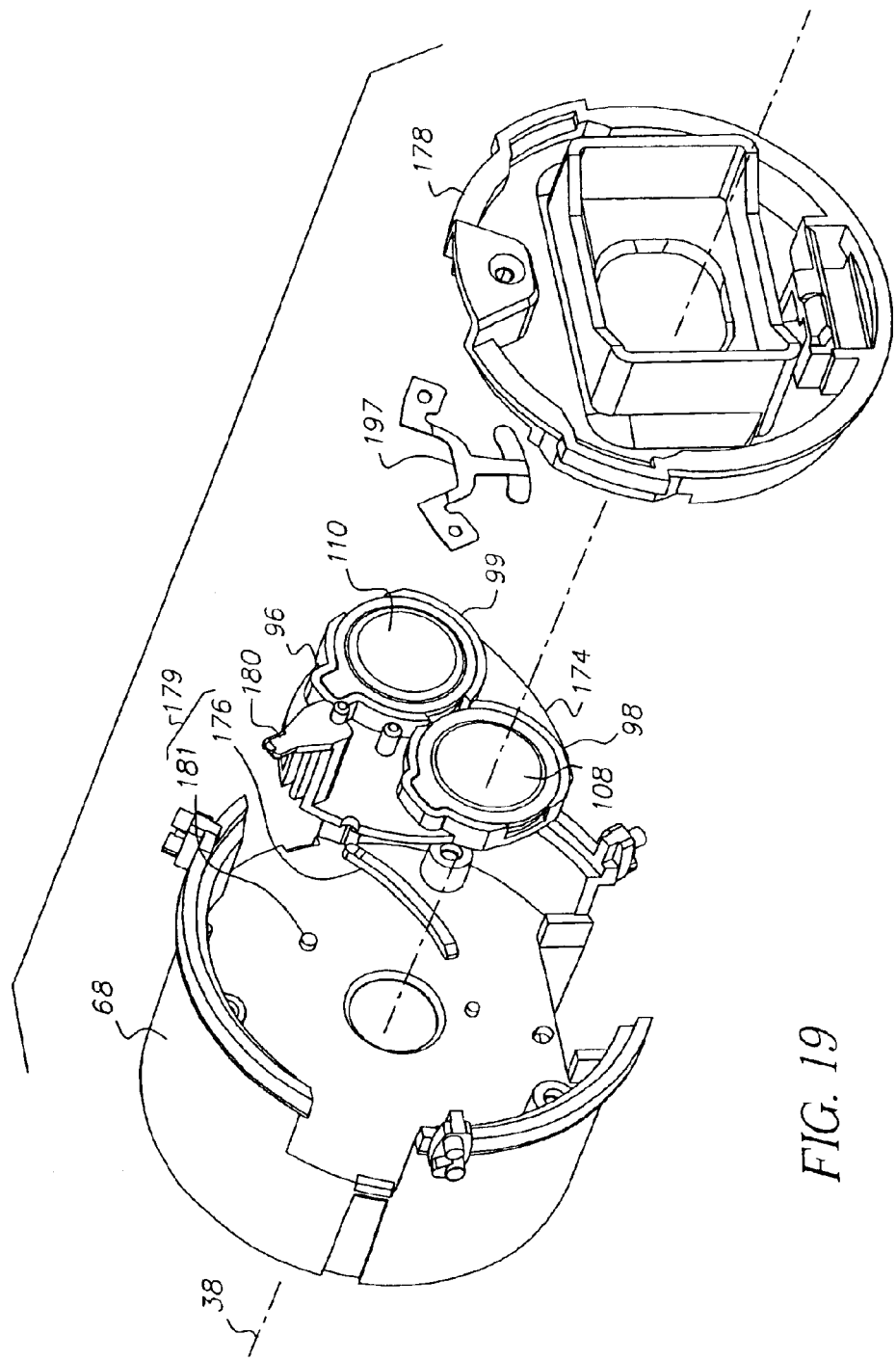

FIG. 19 is a partially exploded, rear perspective view of the lens barrel the camera of FIG. 1.

Figure 20:
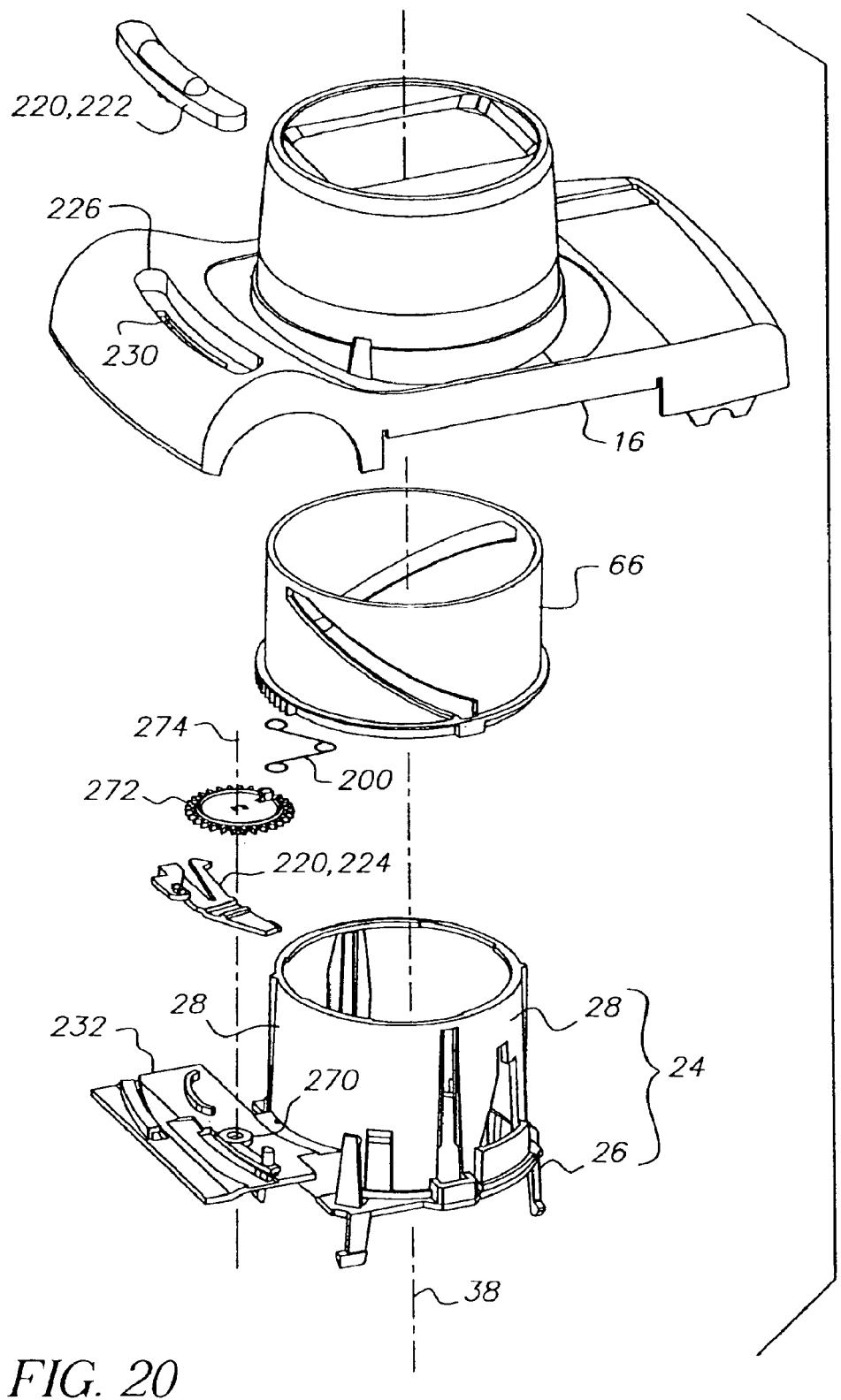

FIG. 20 is a simplified, exploded perspective view of another embodiment of the camera. For clarity, only the over-center mechanism and related parts are shown.

Figure 21:
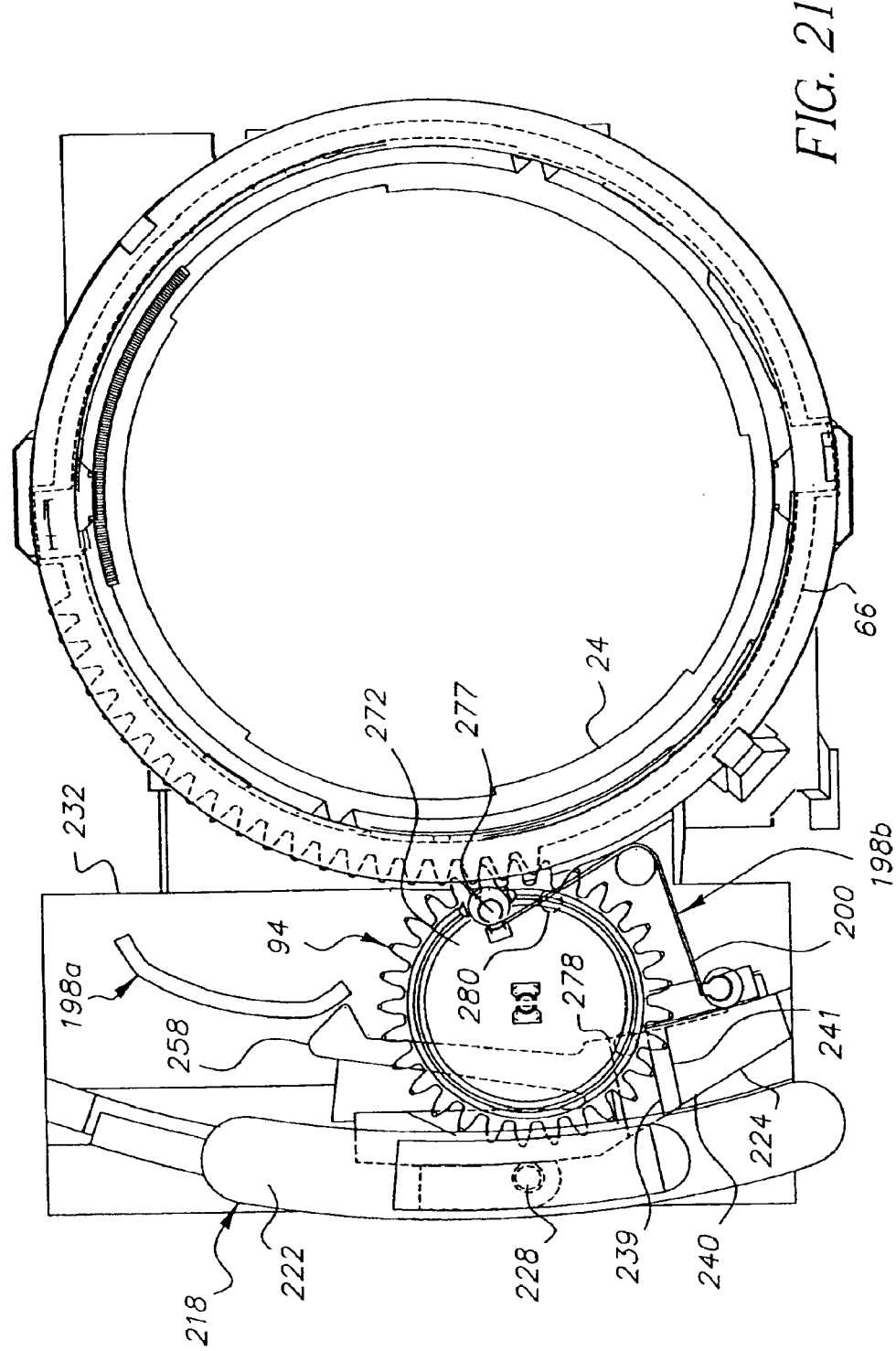

FIG. 21 is a front view of the actuator base, support, and twist ring of the camera of FIG. 20. The twist ring is shown in a wide angle position.

Figure 22:
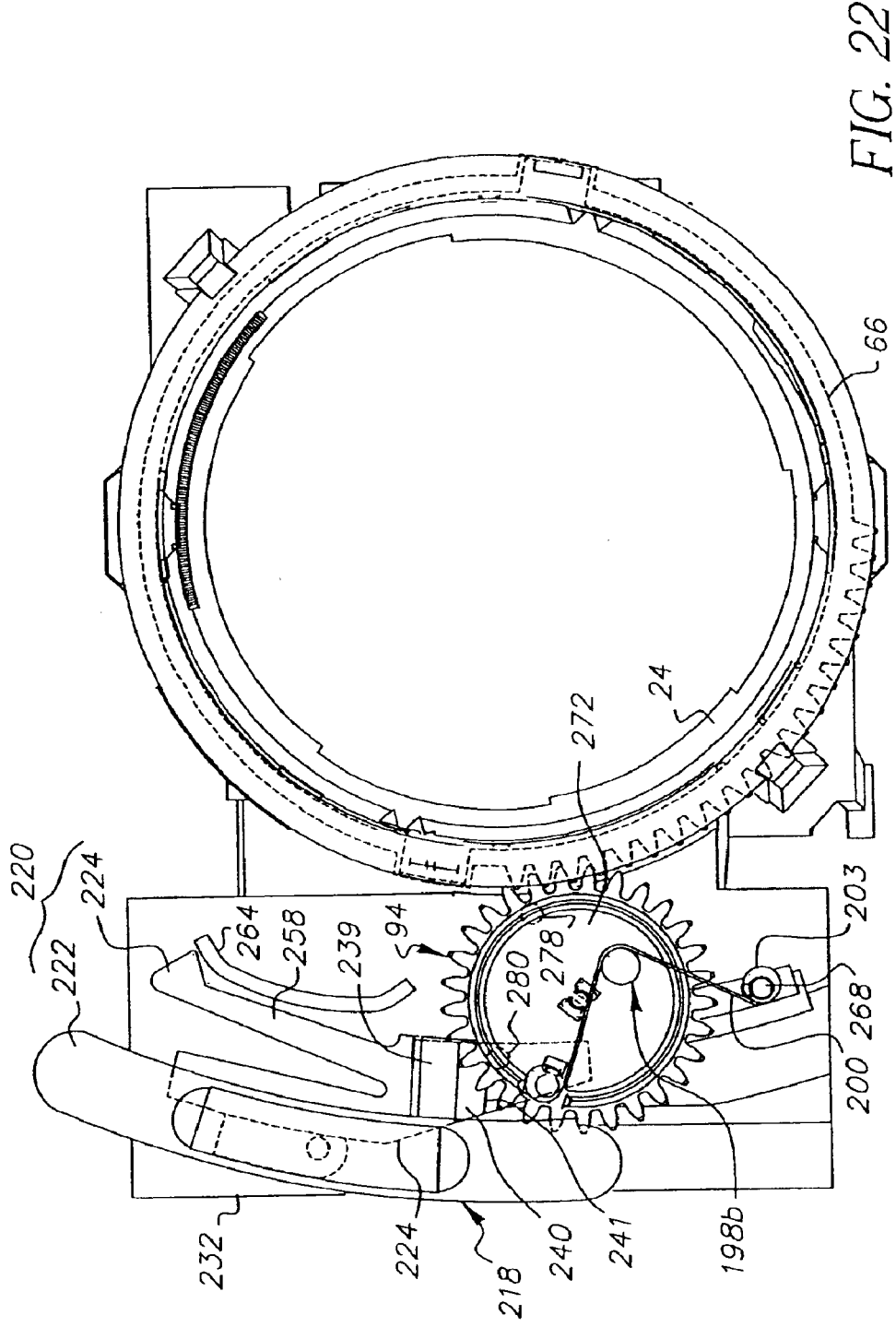

FIG. 22 is a is the same view as FIG. 21, but the twist ring is shown in the telephoto position.

Figure 23:
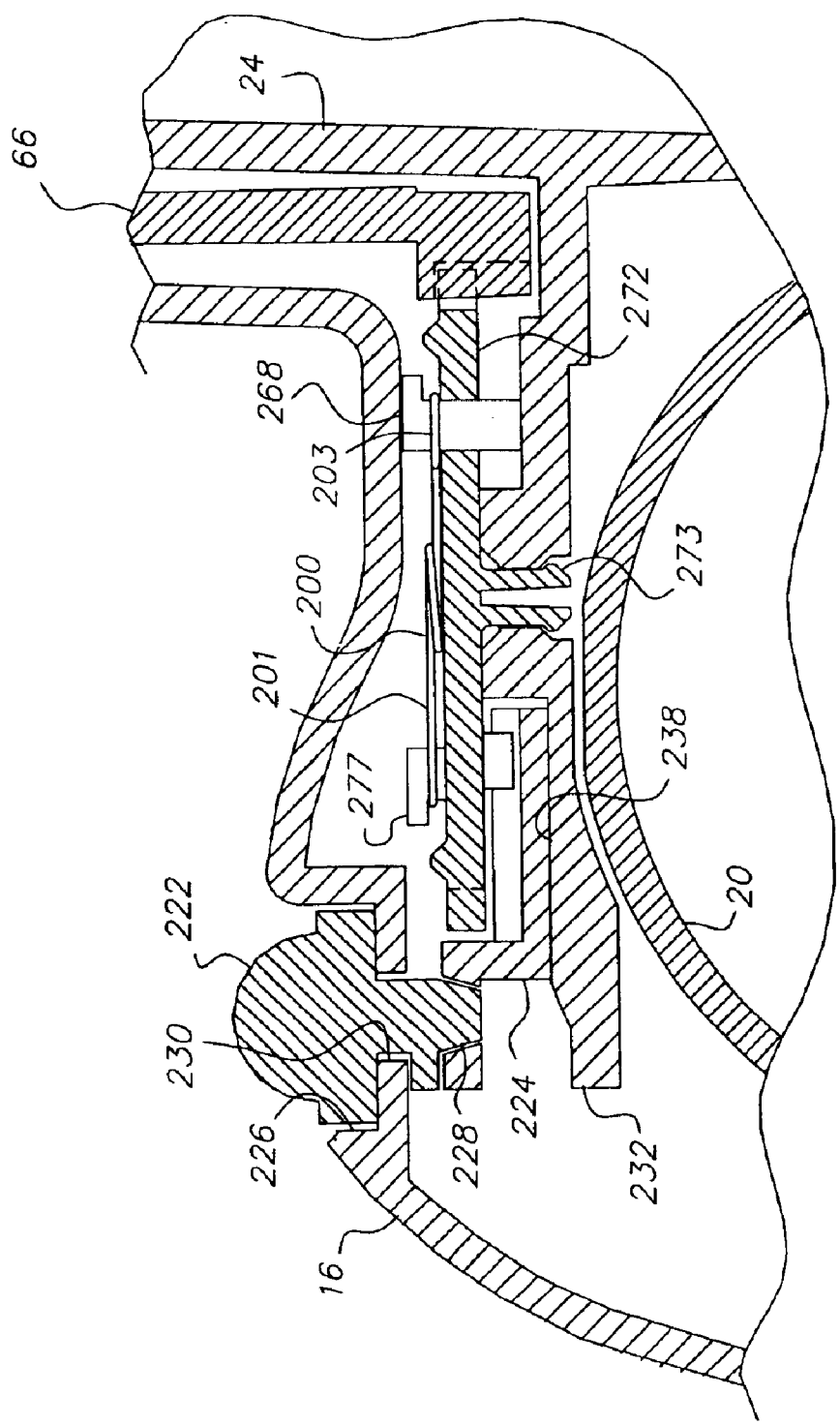

FIG. 23 is a partial cross-sectional view of the deployment apparatus of FIG. 20. The twist ring is in the telephoto position.

Figure 24:
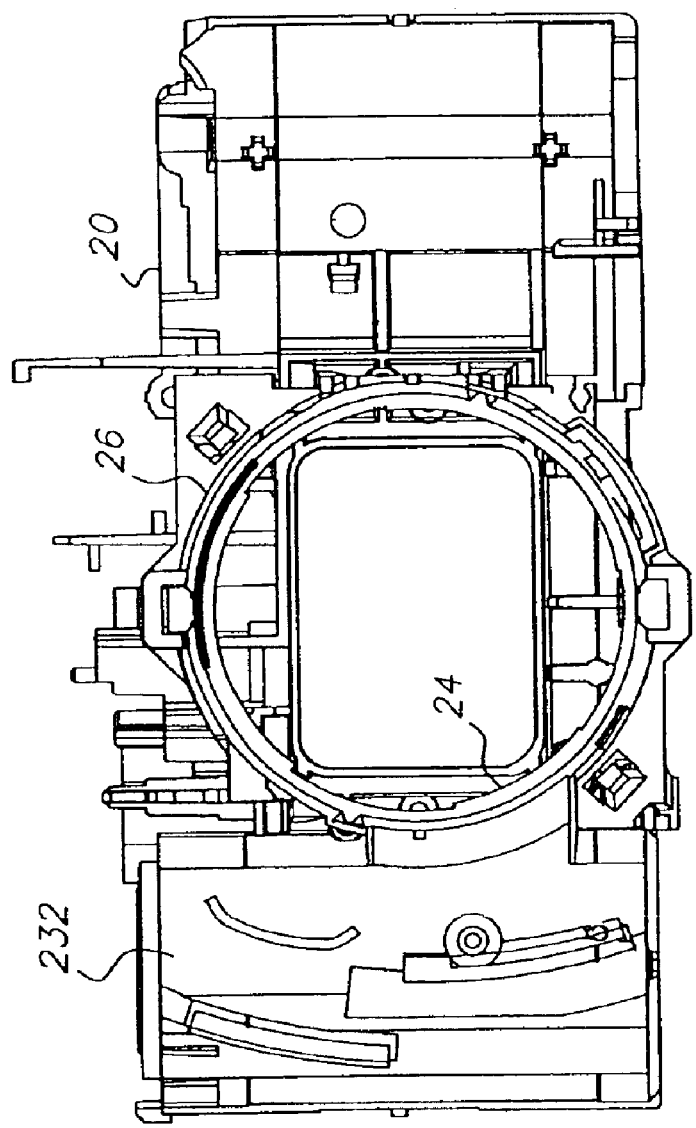

FIG. 24 is a front view of the camera frame, support, and actuator base of the camera of FIG. 20.

Figure 25:
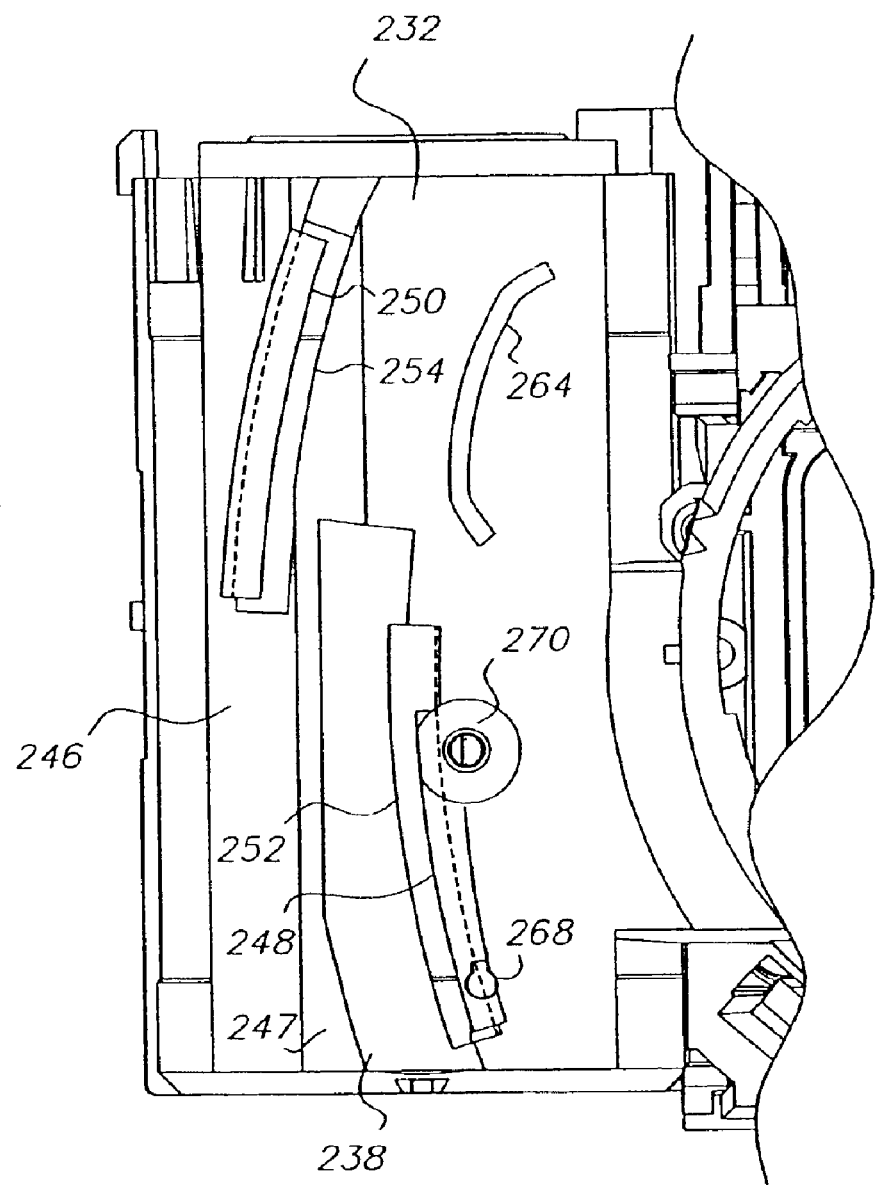

FIG. 25 is a partial enlargement of the view of FIG. 24, showing the actuator base.

Figure 26:
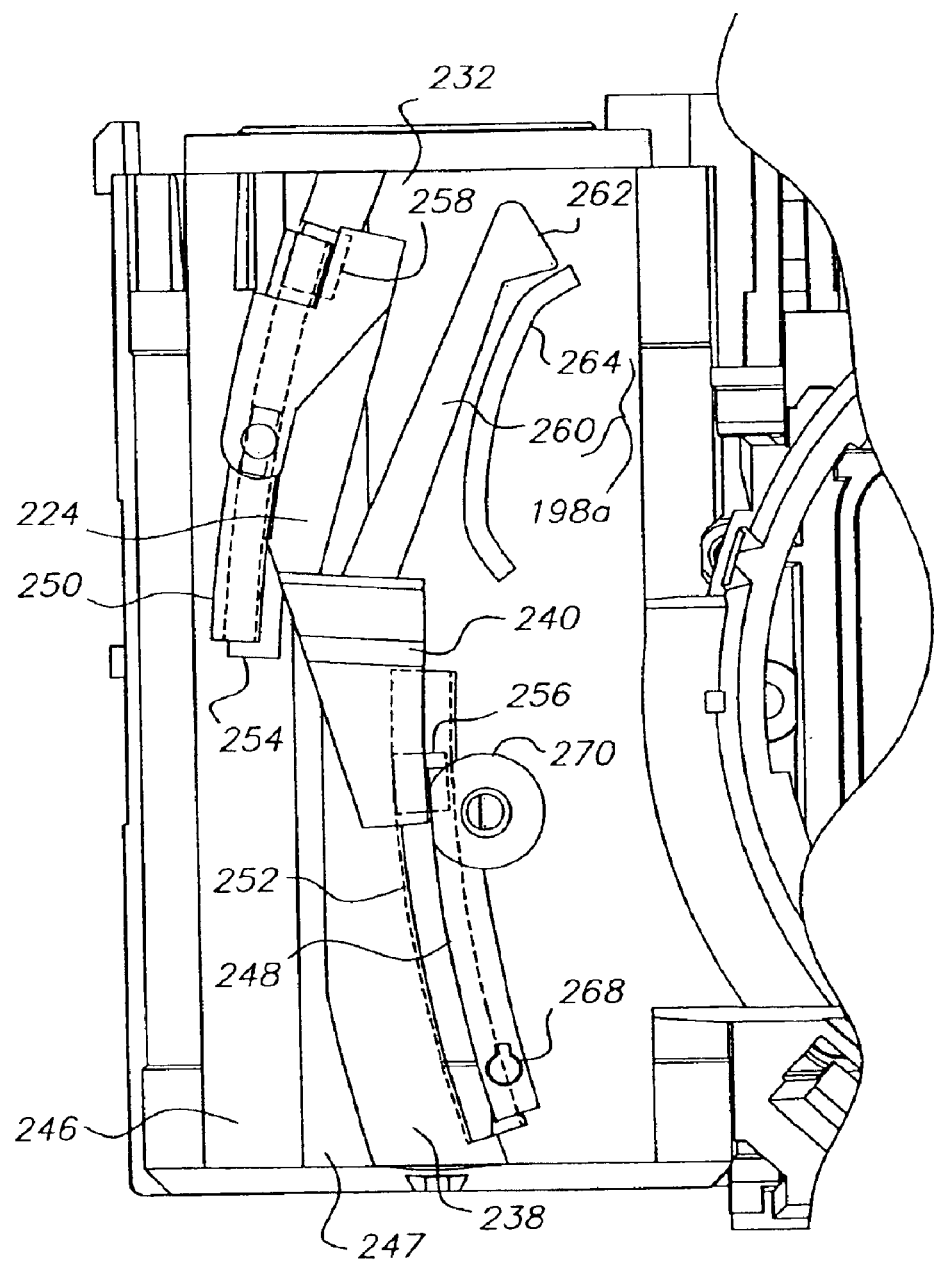

FIG. 26 is the same view as FIG. 25, except that the inner subunit of the actuator is also shown.

Figure 27:
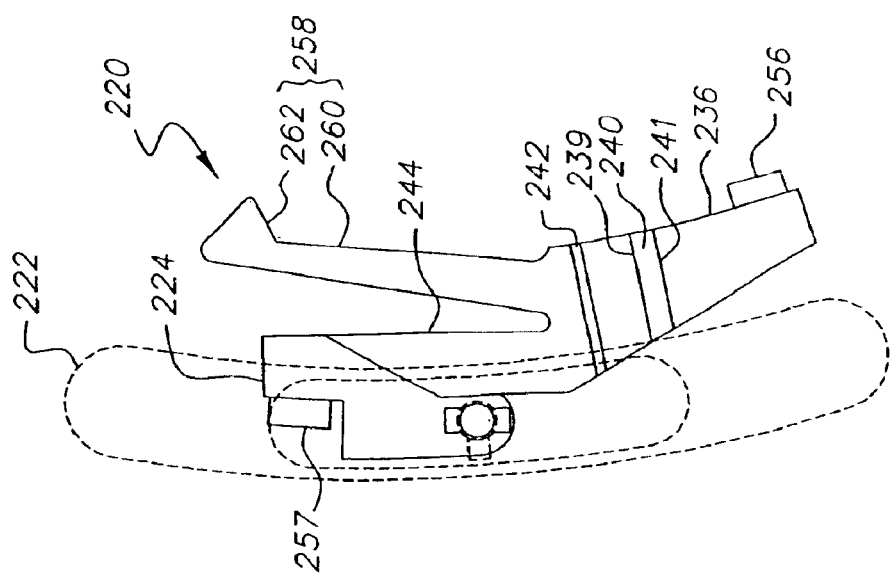

FIG. 27 is a front view of the actuator of the camera of FIG. 20. The outer subunit of the actuator is shown by dashed lines.

Figure 28:
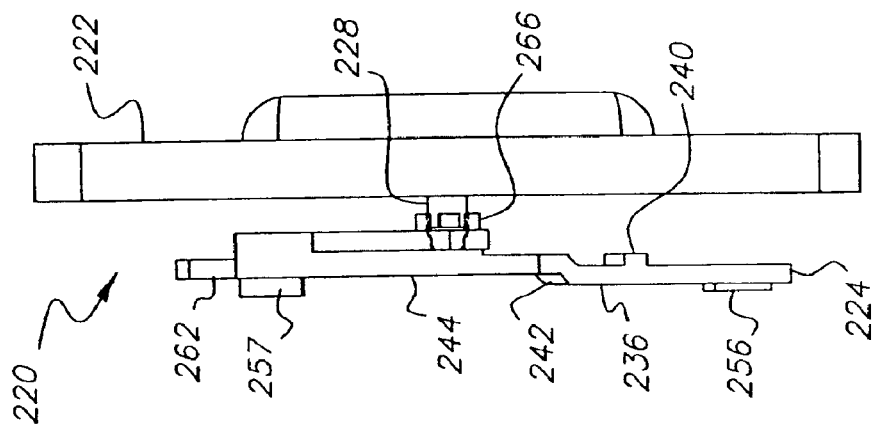

FIG. 28 is a side view of the actuator of the camera of FIG. 20.

Figure 29:
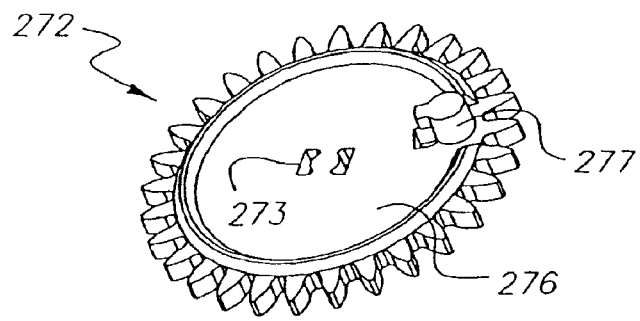

FIG. 29 is a perspective view of the drive unit of the camera of FIG. 20.

Figure 30:
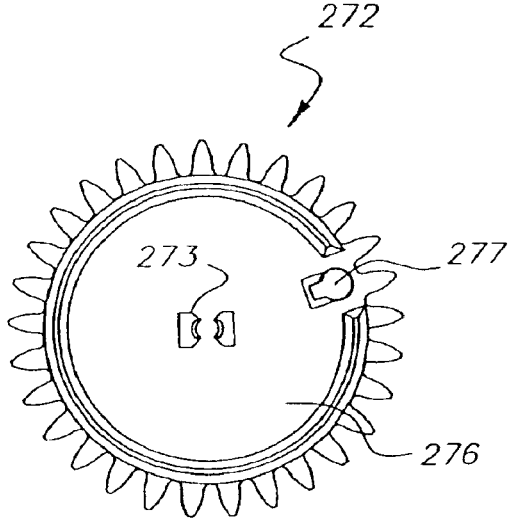

FIG. 30 is a front view of the drive unit of FIG. 29.

Figure 31:
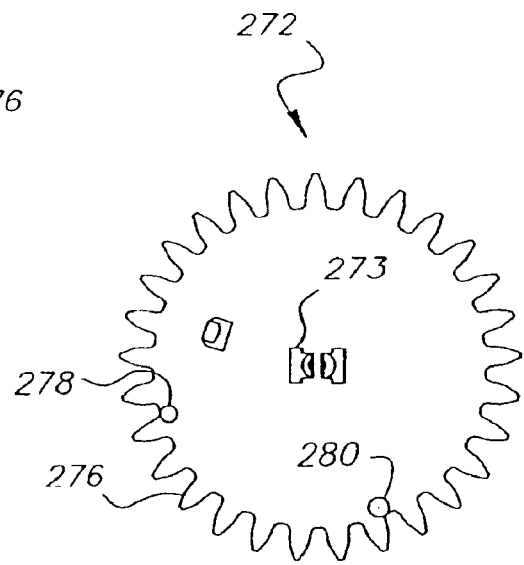

FIG. 31 is a rear view of the drive unit of FIG. 29.

Figure 32:
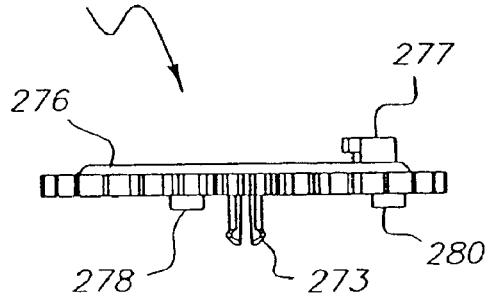

FIG. 32 is a bottom view of the drive unit of FIG. 29.

Figure 33:
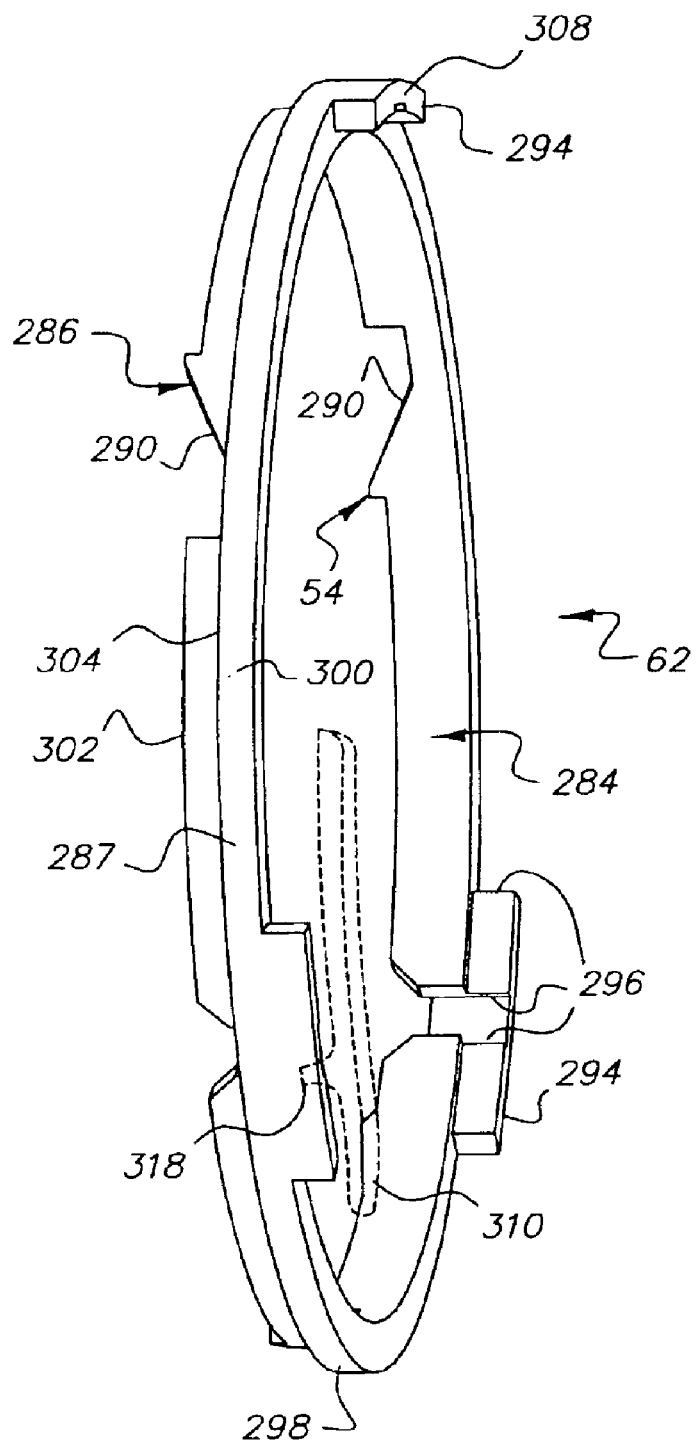

FIG. 33 is a front perspective view of the front travel stop of the camera of FIG. 1. A portion of the coverglass is shown in dashed lines.

Figure 34:
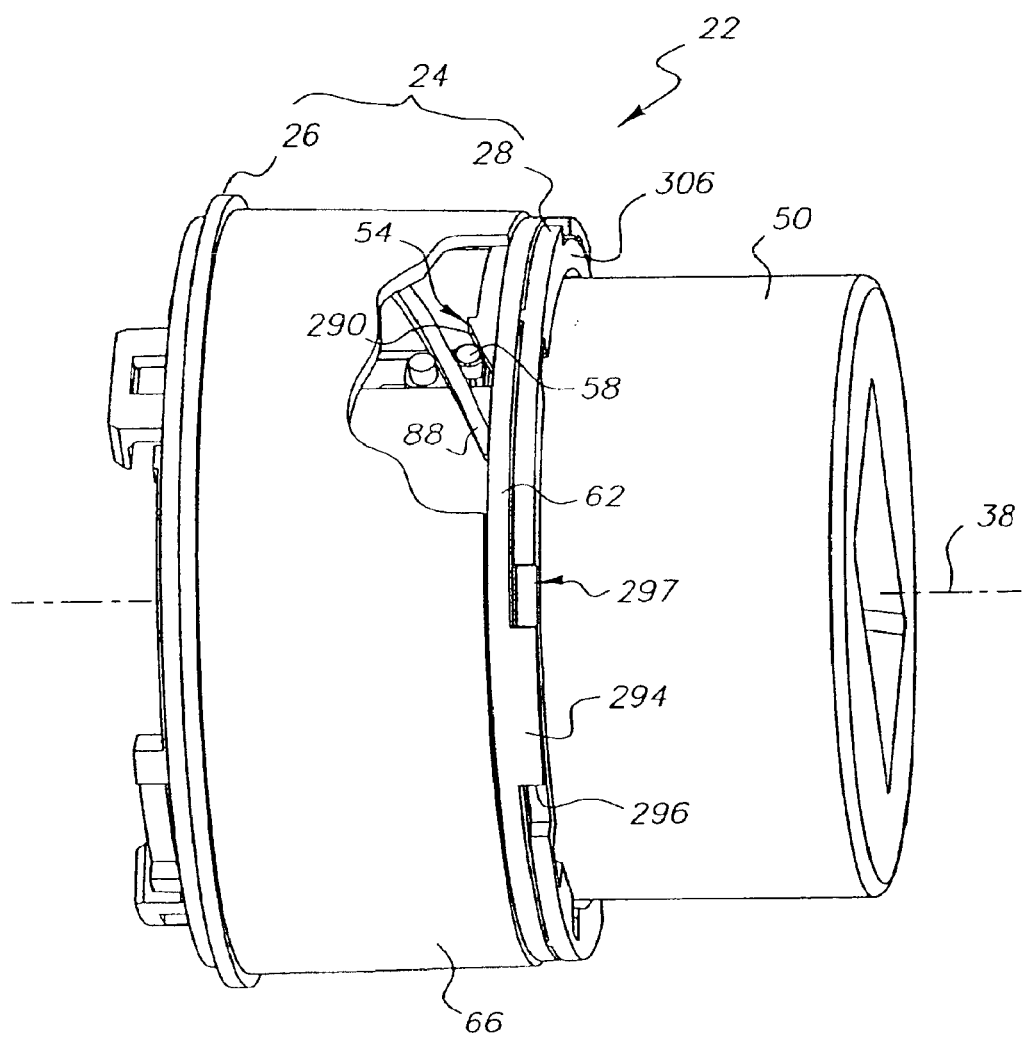

FIG. 34 is a partially cutaway, front perspective view of the lens module of the camera of FIG. 1.

Figure 35:
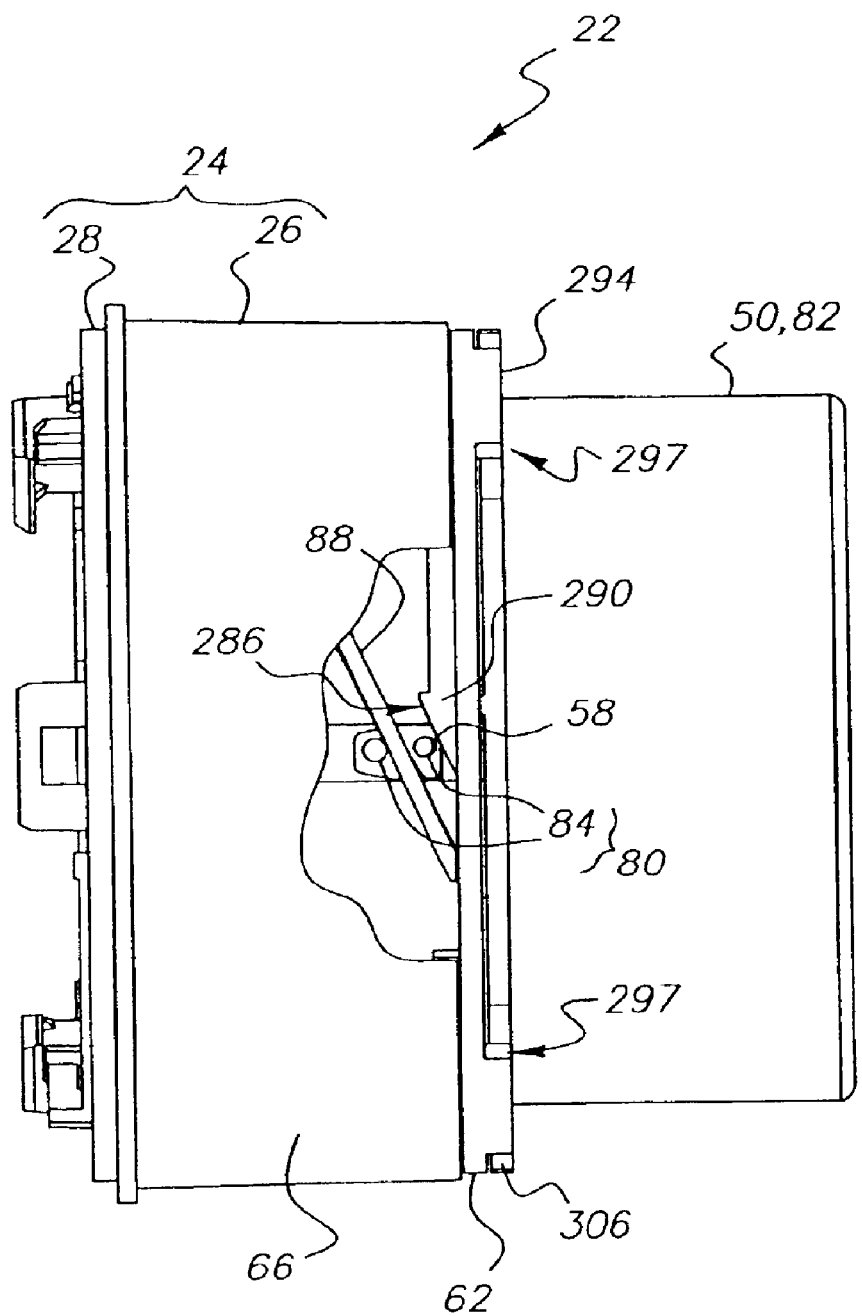

FIG. 35 is a partially cutaway, side view of the lens module of the camera of FIG. 1.

Figure 36:
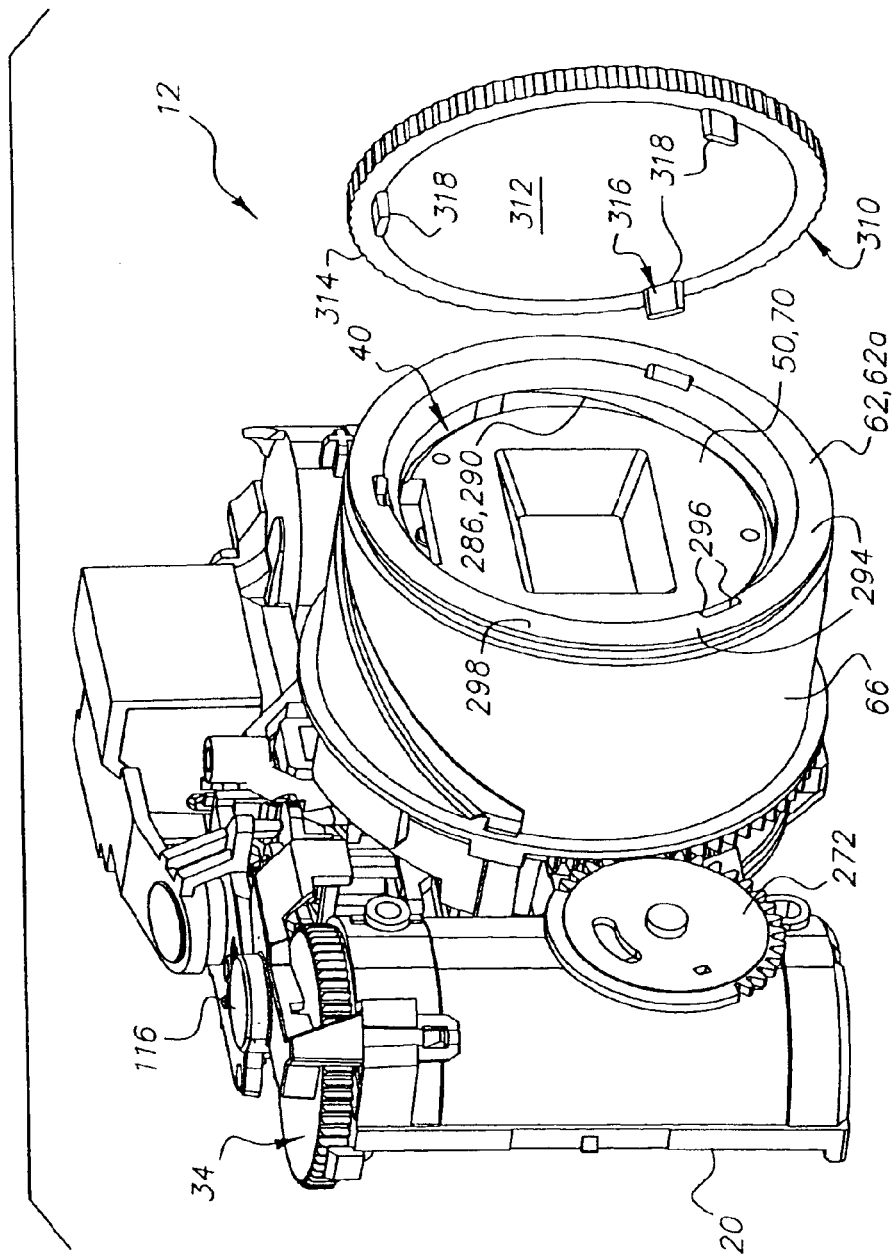

FIG. 36 is a front perspective view of a frame assembly of another embodiment of the camera. A cover glass is shown separated from the lens module.

Figure 37:
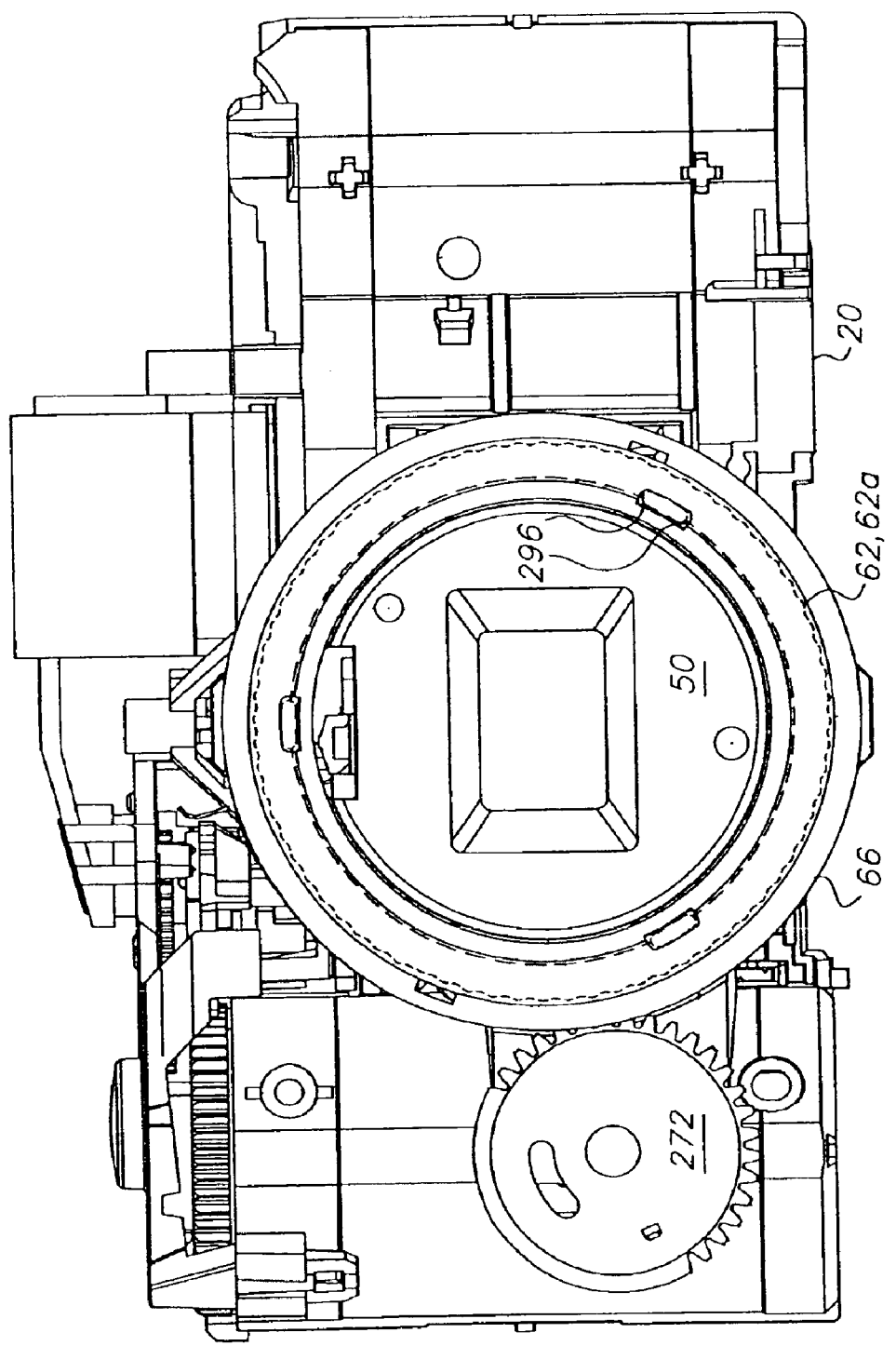

FIG. 37 is a front view of the frame assembly of FIG. 36.

Figure 38:
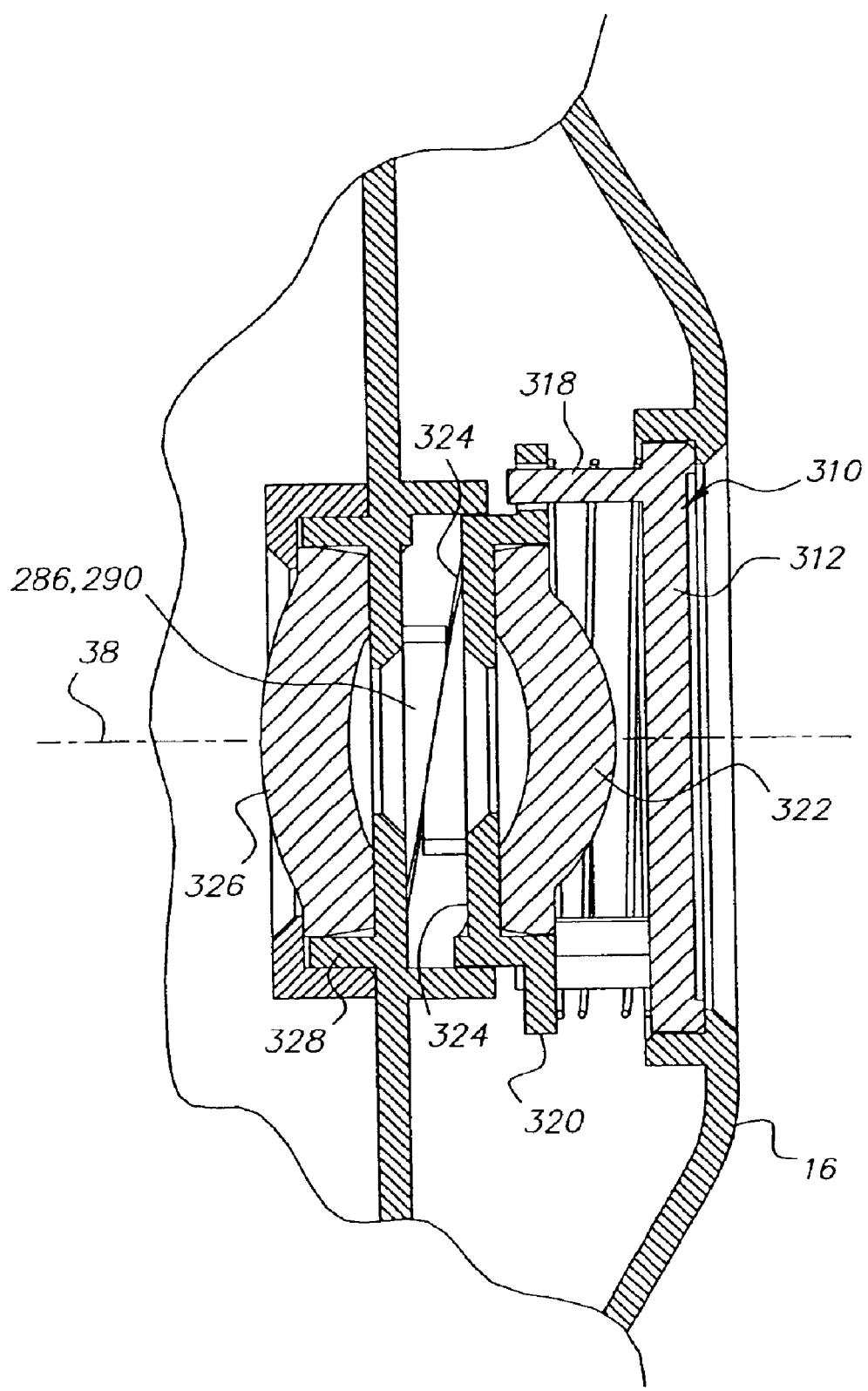

FIG. 38 is a partial cross-sectional view of another embodiment of the camera.

Figure 39:
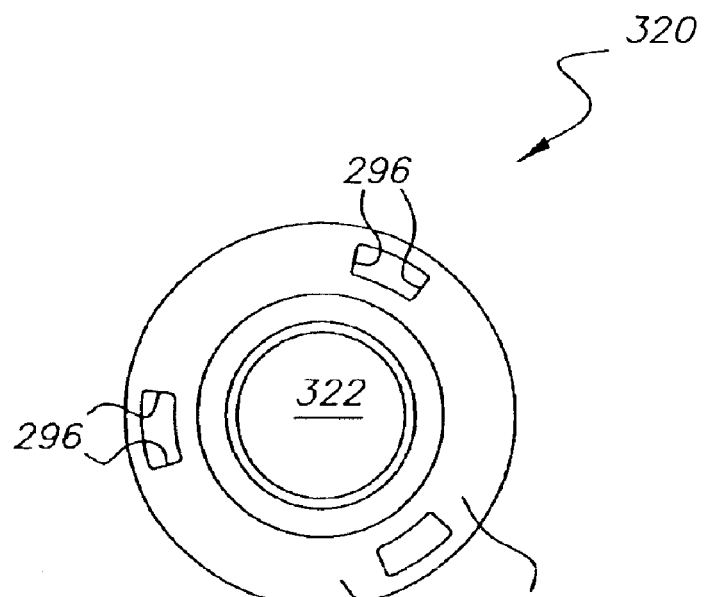

FIG. 39 is a front view of the front lens holder and front lens of FIG. 38.

Figure 40:
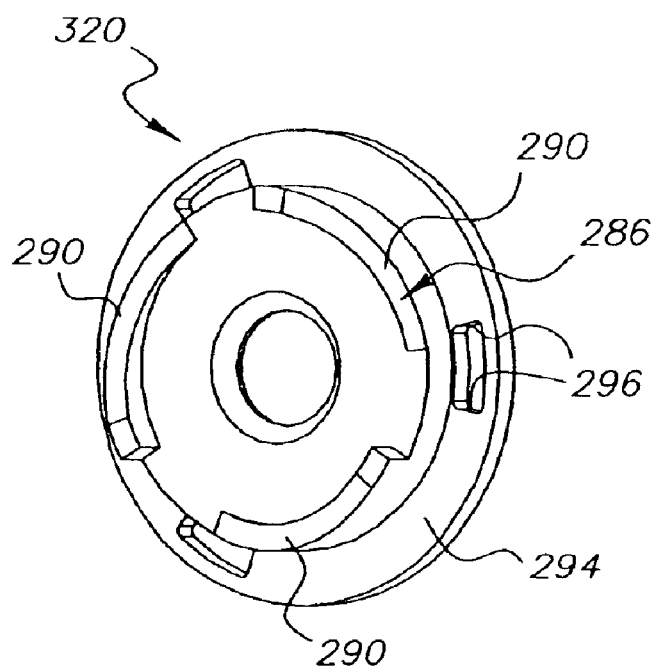

FIG. 40 is a front perspective view of the front lens holder of another embodiment of the camera.

Figure 41:
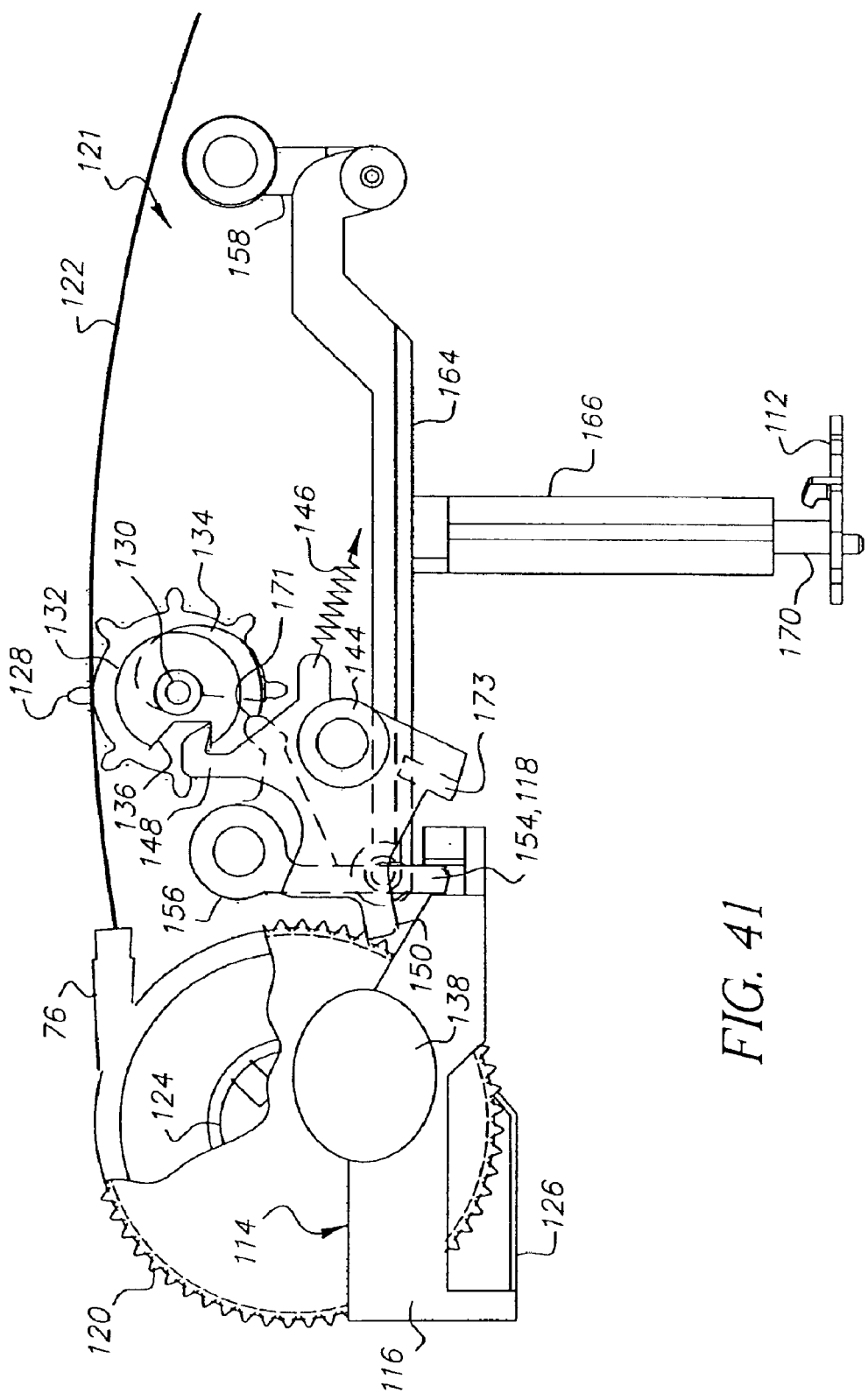

FIG. 41 is a top view of the shutter mechanism, film transport, and other related parts of the camera of FIG. 1. The shutter is in the closed position.

Figure 42:
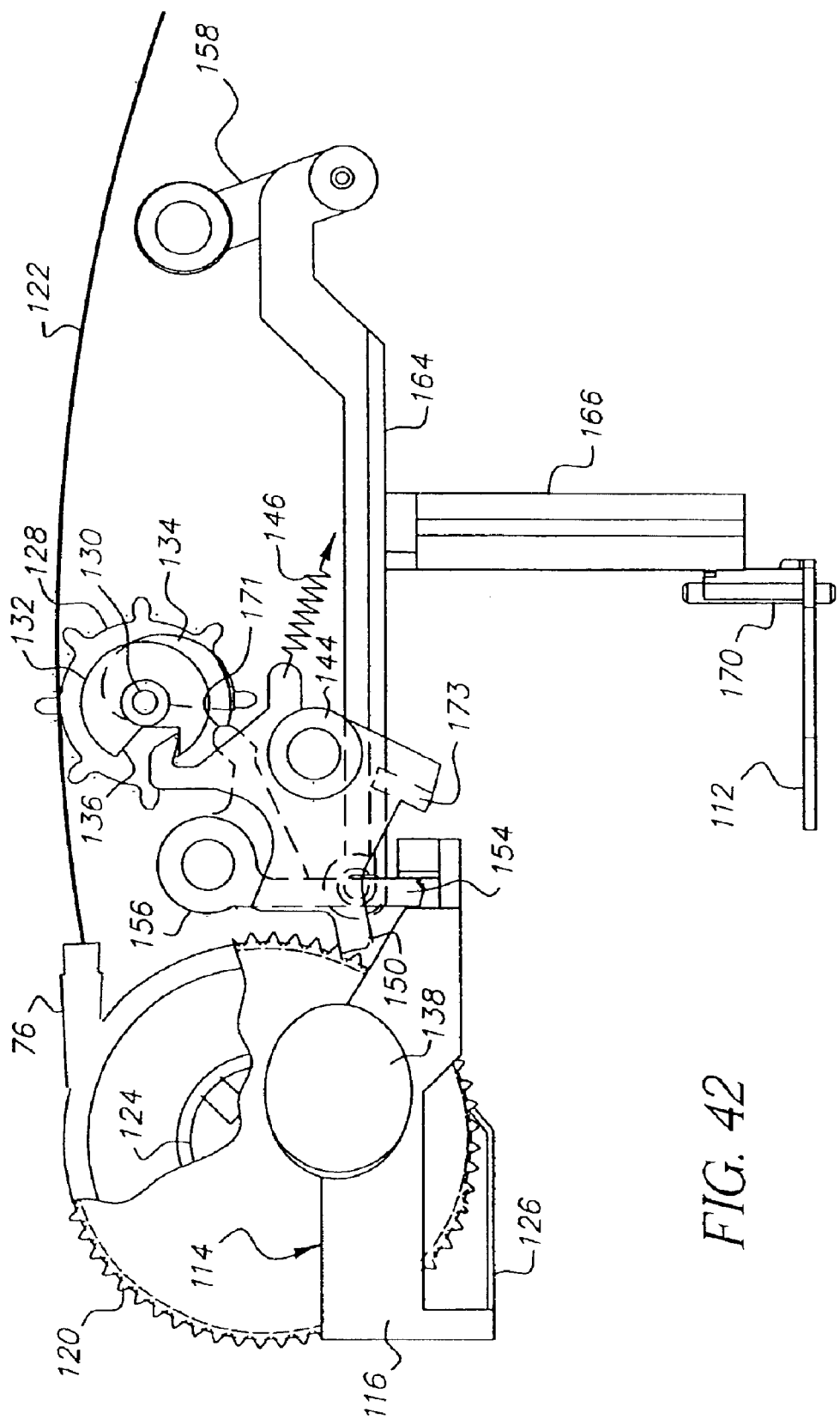

FIG. 42 is the same view as FIG. 41, but the shutter is in the opened position.

Figure 43:
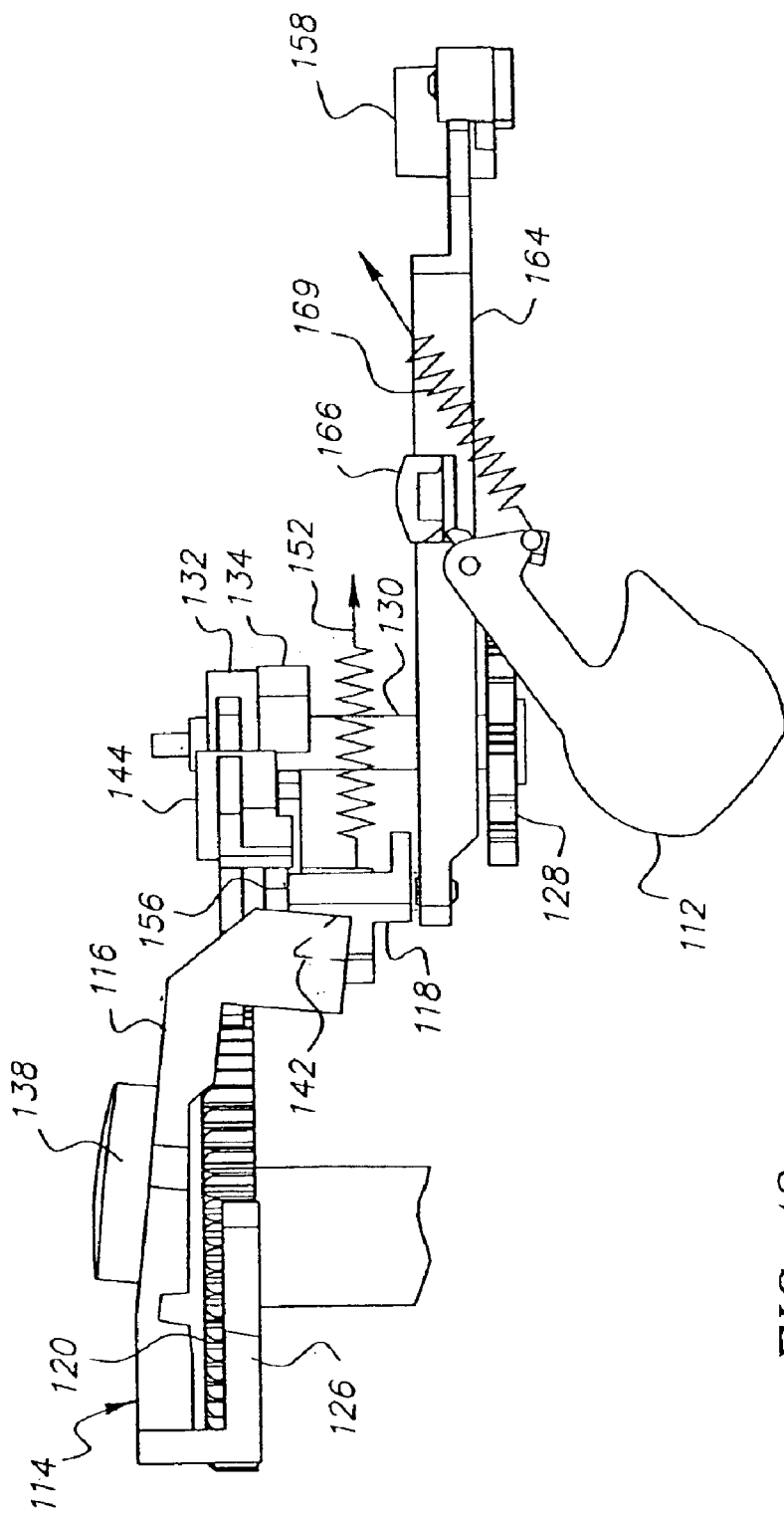

FIG. 43 is a top view of the same features as FIG. 42, showing the shutter in the opened position.

Figure 44:
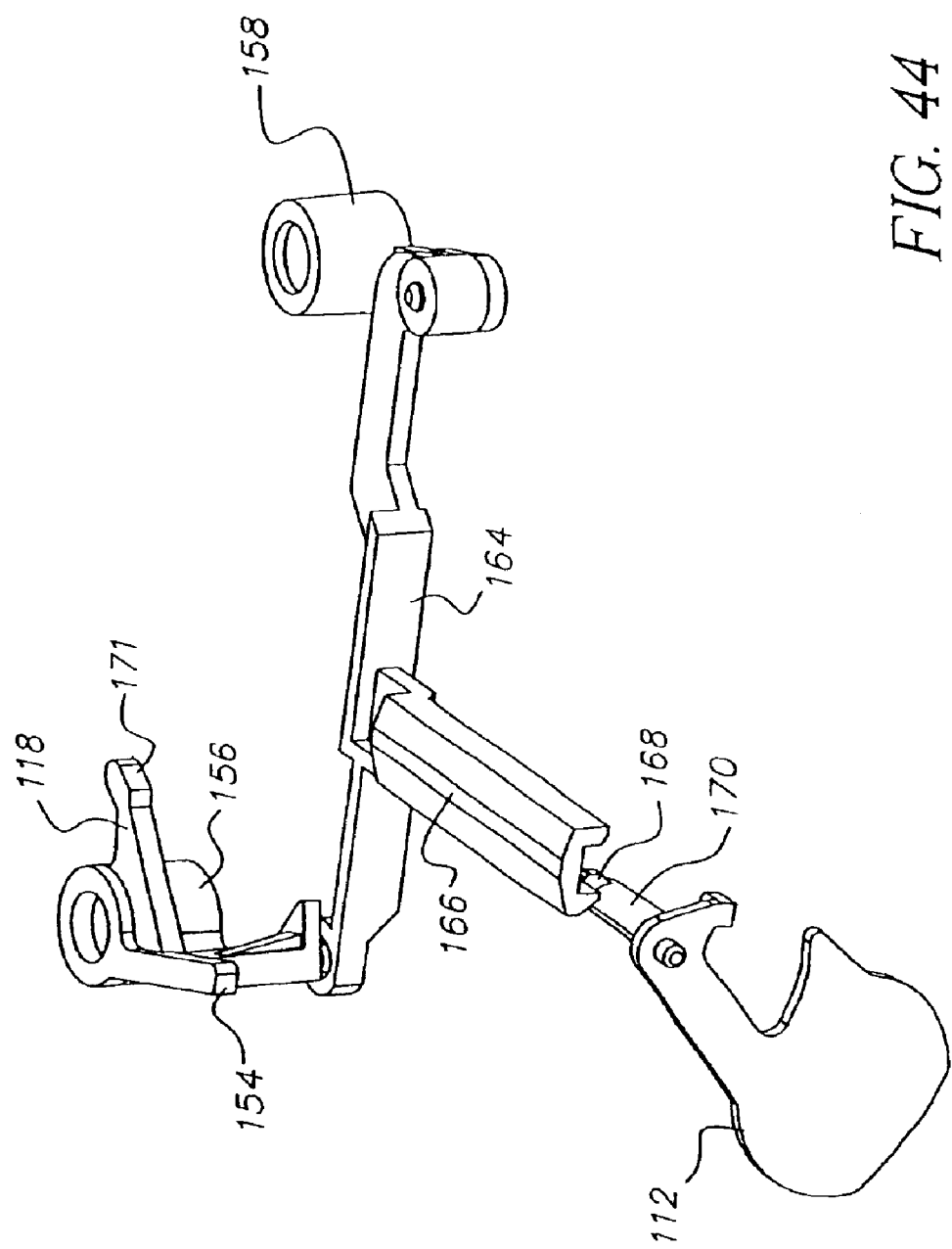

FIG. 44 is a perspective view of the shutter and shutter driver of FIGS. 42–43.

Figure 45:
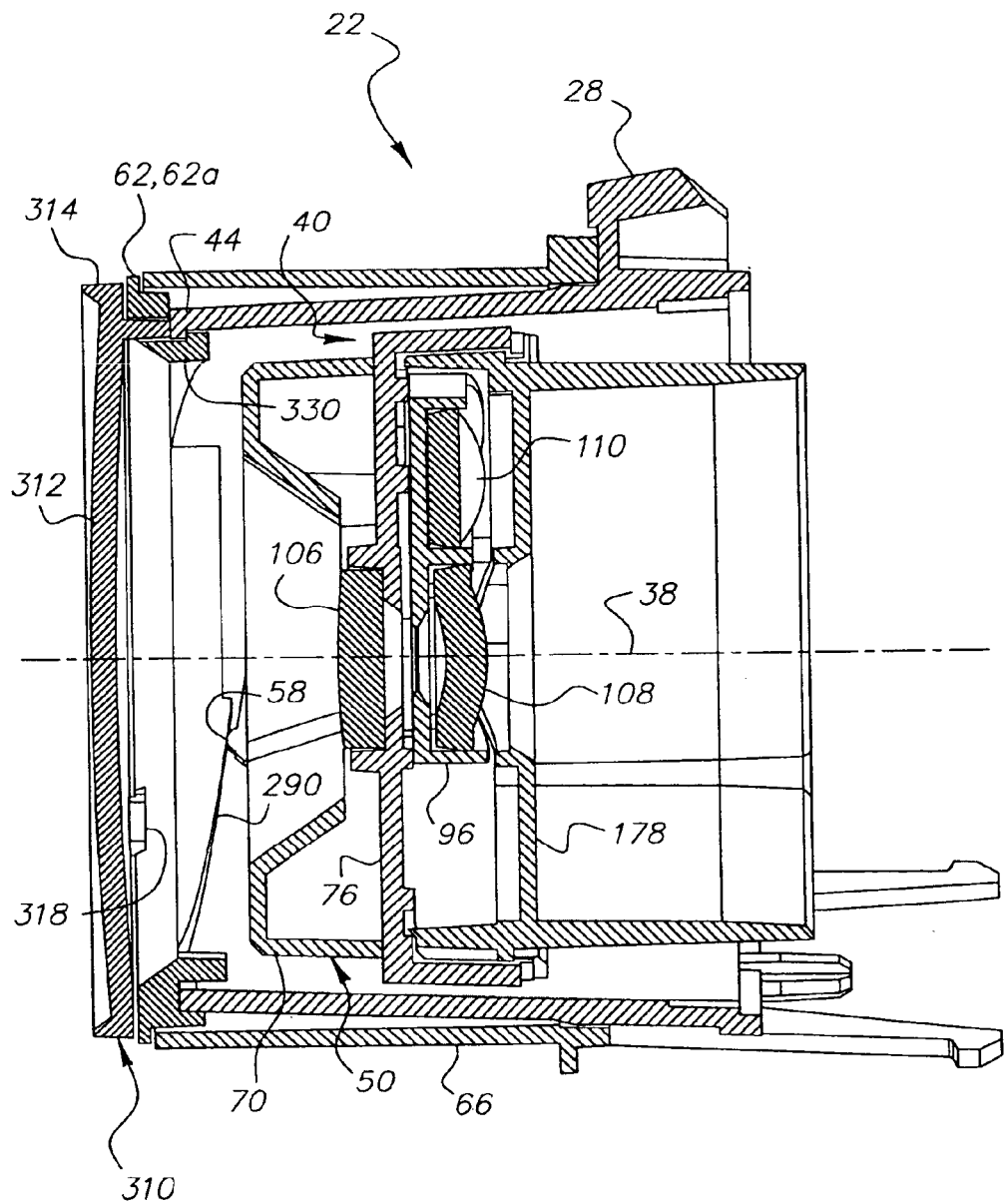

FIG. 45 is a cross-sectional view of the frame assembly of FIG. 36. The shutter is in an open position and is, thus, not visible in the figure.

DETAILED DESCRIPTION OF THE INVENTION

The term "fixed" and like terms are used herein in the sense of a physical position or relationship that is in immobile and unchanging. The term "camera assembly" is used here to refer to a complete camera or an incomplete subunit of a camera that can be assembled with other parts to form a complete camera. The term "camera assembly" is inclusive of a complete one-time use camera and of a subassembly of a one-time-use camera. The usage of "camera" in the term "camera assembly" does not limit possible uses of a particular camera assembly. For example, a "camera assembly" that includes a lens system is inclusive of the usage of the same assembly as a component of a binoculars. For convenience, camera assemblies are generally designated by more descriptive names related to respective functions in a completed camera.

Turning now particularly to FIGS. 1–4, the camera 10 has a frame assembly 12 held within a shell having front and rear covers 16,18. The frame assembly 12 includes a frame 20 to which a number of other camera components are attached.

In the embodiment disclosed herein, one of those components is a lens module 22, which includes a support 24 that is joined to the frame 20.

The support 24 has a mount 26 and a guide 28 that is joined to the mount 26. The support 24 can be permanently attached to the frame 20 or can be reversibly removable. The latter is convenient for the recycling of one-use-time cameras. The manner of attachment is not critical. The support 24 can be hooked to the frame 20 by hooks 30 and matching holdfasts (not shown). Other types of fasteners can also be used. The support 24 can also be adhered to the frame 20, or held by friction fit, or by some other means. The frame 20 and support 24 or frame 20 and mount 26 can be made as a one-piece plastic casting, if desired, or can each be a one-piece plastic casting.

The camera 10 includes a capture unit 32 that captures and stores images. The type of capture unit 32 used is not critical. The capture unit 32 can capture images on photographic film. In that case, it is convenient if the frame 20 has a pair of opposed chambers (not separately identified in the figures). Film is wound from chamber to chamber across a capture plane (not shown). Film related features (not shown), such as a film transport 34, can be provided in a manner well known to those of skill in the art.

With an electronic capture unit, the photographic film is replaced by an electronic imager (not shown). The imager is controlled by a control system that includes electronic memory. Captured images are stored in memory and can be manipulated by the control system. Features of such electronic capture units are well known to those of skill in the art.

A flash unit 36 and other camera components, well known to those of skill in the art, can also be included in the camera 10. The flash unit 36 and other components are mounted to the frame 20 or held between the frame 20 and the covers 16,18.

The support 24 defines an optical axis 38. The guide 28 extends forward from the mount 26 along the optical axis 38 and encircles a central passage 40 aligned with the optical axis 38. The term "encircles" and like terms are used in a broad sense that does not imply and is not limited to circular shapes, nor to structures without gaps or openings. In the embodiments discussed herein, the central passage 40 is generally circular in cross-section. It will be understood that like considerations apply to embodiments having like features of other shapes. The guide 28 has a rearward rim 42 that adjoins the frame 20 and a forward rim 44 opposite the rearward rim 42.

The mount 26 is a forward-facing shallow cup (see FIGS. 3–7) that receives the guide 28. A central opening 46 of the mount 26 can be bordered by a masking structure 48 that blocks unwanted light, so reducing flare. The guide 28 is snapped, adhered, or otherwise fastened in fixed relation to the mount 26. The mount 26 and guide 28 are conveniently provided as two pieces, but can be provided as a single piece.

A lens barrel 50 is reversibly movable along the central passage 40, in alignment with the optical axis 38, from a retracted position, through a plurality of intermediate positions, to an extended position. It is preferred that the movement is rectilinear and that the guide 28 blocks rotation of the lens barrel 50 about the optical axis 38. The lens barrel 50 can be disposed fully within the guide 28 in extended and retracted positions of the lens barrel 50 can protrude from the guide 28 in the extended position or in both extended and retracted positions. The invention is generally described herein in relation to an embodiment in which the lens barrel 50 is disposed completely within the guide 28, in the extended and retracted positions. The front cover 16 encloses the guide 28, except at a cover opening 52 aligned with the optical axis 38. The lens barrel 50 can, alternatively, protrude from the guide 28 in the extended position or in both extended and retracted positions. In this case, the margin of the opening 52 in the front cover 16, encircles the lens barrel 50 (not shown).

Referring now to FIGS. 8–12 and 33–35, the extended and retracted positions of the lens barrel 50 are delimited by a front rest 54 and a rear rest 56, respectively. The rests 54,56 are spaced apart from each other along the optical axis 38 and each border the central passage 40. The lens barrel 50 has first and second contact surfaces 58,60. In the extended position, the first contact surface 58 bears against the front rest 54. In the retracted position, the second contact surface 60 bears against the rear rest 56.

FIGS. 8–10 and 33–35 illustrate one embodiment of the front rest 54. FIGS. 11–12 illustrate another embodiment. The rear rest 56 can be the same or different, as desired. In the embodiments of FIGS. 8–10 and 33–35, the front rest 54 is a portion of the inner surface of a travel stop 62a that is joined to the forward rim 44 of the guide 28. (This embodiment is discussed below in detail.)

In the embodiment of FIGS. 11–12, the front rest 54 is a set of inwardly extending protrusions or posts 64 of the forward rim 44. Bolts that extend through threaded openings in the forward rim 44 can be used instead to provide an adjustable rest, if desired. In FIGS. 11–12, the first contact surface 58 of the lens barrel 50 is flat. As shown in FIGS. 33–35, the first contact surface 58 can, alternatively, be provided on pins or other structures (discussed below in detail). One or both of the forward rim 44 and first contact surface 58 can have protrusions or the like or one or both can also be flat.

It is preferred that contact between the first and second contact surfaces 58,60 and the respective forward and rearward rims 44,42 is tripodal, that is, three point contact. For example, three protrusions 64 can be provided in the embodiment of FIGS. 11–12. Three point contact reduces any risk of wobbling and, in addition, reduces the areas in contact. This makes accurate part alignment simpler in production.

Referring to FIGS. 1–3 and 8–10, in some embodiments, a twist ring 66 is mounted on the guide 28. The twist ring 66 encircles the guide 28 or extends at least part of the way around the guide 28. The twist ring 66 mechanically engages the lens barrel 50, such that rotation of the twist ring 66 moves the lens barrel 50 along the optical axis 38 between the extended and retracted positions. The twist ring 66 is trapped in place axially by the forward rim 44 of the guide 28 and/or the travel stop 62a or other parts. (See FIGS. 5 and 8.) The mechanical coupling between the twist ring 66 and the lens barrel 50 is a cam-type extension-retraction mechanism. Other types of extension-retraction mechanism can be used. For example, the twist ring 66 and lens barrel 50 can be linked by a gear train, pins that ride in cam slots or grooves, or the like.

The lens barrel 50, as shown in FIGS. 3–4, includes a traveler 68 that acts as a support structure and a cap 70 that closes the forward end of the traveler 68. The traveler 68 and cap 70 can each be a one-piece plastic casting. In the illustrated embodiment, the traveler 68 includes a tracker 72 and has a crosswall 74 that extends in a direction perpendicular to the optical axis 38 and a circumferential outside wall 76 that encircles the crosswall 74. The crosswall 74 has a central opening or primary aperture 78 that is aligned with the optical axis 38.

In particular embodiments, the tracker 72 has three track followers 80 that extend outward relative to a main portion 82 of the lens barrel 50. The track followers 80 can be equally spaced about the traveler 68 to help prevent the traveler 68 from canting relative to the support 24. Each track follower 70 has a pair of spaced apart posts 84. The twist ring 66 has a tracking portion 86 that receives the tracker 72 of the traveler 68 and constrains of the traveler 68, such that the traveler 68 moves forward and backward along the optical axis 38 when the twist ring 66 is rotated between the rightward and leftward configurations.

The tracking portion 86 of the twist ring 66 is a set of internal tracks 88 that spiral about the optical axis 38. Each track 88 receives a respective one of the track followers 80 of the traveler 68. In particular embodiments, the tracks 88 are spiral ribs that extend toward the optical axis 38 from the circumferential wall 90 of the twist ring 66. The tracks 88 are gripped between the posts 84 of the respective track followers 80. Alternatively, tracks 88 can be grooves or pairs of parallel fences that receive track followers 80 configured to ride in the grooves or between the fences. The extension-retraction mechanism features of the lens barrel 50 and twist ring 66 also can be interchanged, for example, the posts 84 can be provided on the twist ring 66 rather than the lens barrel 50.

The track followers 80 extend to the tracks 88 through corresponding slots 92 in the guide 28. The slots 92 each extend parallel to the optical axis 38. In illustrated embodiments, there are three slots 92 and three corresponding tracks 88. The track followers 80 slide along the tracks 88 when the twist ring 66 is rotated. Since the track followers 80 are held by the slots 92 of the support 24, this results in the lens barrel 50 traversing linearly inward or outward along the optical axis 38.

The first and second contact surfaces 58,60 are parts of the traveler 68. In the embodiment shown in FIGS. 33–35, the first and second contact surfaces 58,60 are opposed portions of the posts 84 of the track followers 80.

In the embodiment of the FIG. 11-12, the first and second contact surfaces 58,60 are portions of the front and rear of the traveler 68. In this embodiment, the twist ring 66 is not present. The traveler is, instead, reciprocated using a pivotable link 202 that receives a post 208 of the traveler 68. The link 202 is joined, in fixed (immobile) relation to a rotatable knob or like feature (not shown) that is accessible from the exterior of the camera. The tracker 72 and slots 92 of the guide 28 can be provided as earlier described, or in simplified form. In this embodiment, the tracker only provides guidance and centering of the traveler 68 during movement. Examples of simplifications are limiting the depth of the slots 92, such that the slots 92 do not extend fully through the guide 28 and reducing the number of posts 84 in the track followers 80.

In some embodiments herein, the lens barrel 50 is set up for use in only the retracted and extended positions and not the intermediate positions. A biaser 94 deters against stoppage of the lens barrel 50 in the intermediate positions, as discussed in detail below. Because of this, it is unnecessary for the traveler 68 to be maintained in a more than approximate alignment with the optical axis 38, when the lens barrel 50 is in the intermediate positions. The guide 28 provides this approximate alignment. The guide 28 also retains the traveler 68 in close alignment with the optical axis 38 in the retracted and extended positions.

Referring particularly to FIGS. 33–35, the track followers 80 are loosely held by the tracks 88 of the twist ring 66 and the slots 92 of the guide 28. The twist ring 66 fits loosely on the guide 28. The positions of each track follower 70 are determined by the respective track 88 and slot 92. The loose fit of the track followers 80 in the slots 92 and the twist ring 66 on the guide 28, allows angular misalignment of of the twist ring 66 and traveler 68 relative to the optical axis 38 during movement of the traveler 68 between the retracted and extended positions. The loose fit is advantageous, in that looser tolerances reduce manufacturing costs. This is not problematic, because canting of the traveler 68 is limited to intermediate positions of the traveler 68 between the retracted and extended positions. In the retracted and extended positions, the respective contact surface 58,60 of the traveler 68 is in engagement with the respective rest 54,56. As earlier noted, three point contact between the rest 54,56 and respective contact surface 58,60 can be provided to further help eliminate the risk of tilting of the traveler 68 relative to the guide 28.

The loose fit of the twist ring 66 and tracks 88 does allow some other traveler 68 movement. The track followers 80 can pivot slightly back and forth about the optical axis 38 relative to the respective slots 92 of the guide 28. This can be ignored. Optical elements (discussed below) provided in the traveler 68 can have uniform properties relative to rotation about the optical axis 38. The traveler 68 also has a risk of mispositioning in a direction parallel to the optical axis 38. This parallel mispositioning can be limited by close dimensioning of outer wall 76 of the traveler 68 and the central passage 40 of the guide 28. This can be done throughout the guide 28 or only at the front and rear and of the guide 28 where the traveler 68 enters the retracted and extended positions, respectively.

Referring now to FIGS. 4 and 13–19, a turret 96 is disposed in and supported by the traveler 68. The turret 96 rides with the traveler 68 between the retracted and extended positions. The turret 96 has one or two rear optical element seats 98,99. Each seat 98,99 surrounds an aperture 100,102. The turret 96 is pivotable, relative to the traveler 68, about a pivot axis 104 that extends through the traveler 68 and is parallel to the optical axis 38. The pivoting of the turret 96 is between a first position, shown in FIGS. 8 and 17, in which one of the apertures 100 is in alignment with the optical axis 38, and a second position, shown in FIGS. 10 and 18, in which that aperture 100 is spaced from the optical axis 38 and a second aperture 102, if present, is aligned with the central opening 78 of the traveler 68.

In the embodiments disclosed herein, the turret 96 is located between the outer wall 76 of the traveler 68 and the optical axis 38. This is advantageous for one-time-use cameras, since the outer wall 76 can protect the turret 96 from impacts and the like, during stages of recycling in which the front and rear covers 16,18 have been removed.

A front lens element 106 is mounted in the traveler 68 over the central opening 78, in alignment with the optical axis 38. Optionally, one or more additional optical elements (not shown) are located within the traveler 68. In the embodiment disclosed herein, a first turret lens element 108 is mounted in a first rear optical element seat 98 over the first rear aperture 100. A second turret lens element 110 can be mounted in a second rear optical element seat 99 over the second rear aperture 102. The front and rear lens elements 106,108,110 and other lens elements (if any) together comprise a taking lens system that directs light to the capture plane. The rear lens elements 108,110 are aligned with the optical axis 38 in first and second positions of the turret 96, respectively.

In the embodiment shown in FIGS. 33–35, the front lens element 106 and first turret lens element 108 are a first doublet lens and the front lens element 106 and second turret lens element 10 are a second doublet lens. The first and second rear lens elements 108,110 have different optical powers, providing for different focusing distances or different focal lengths of the first and second doublet lenses. Other optical elements can be provided in addition to or in place of one or both of the turret 96 lens elements.

Referring now to FIGS. 4, 13–16, and 41–44, in some embodiments, a shutter 112 is disposed in the traveler 68 between the crosswall 74 and the turret 96. The shutter 112 moves forward and back along the optical axis 38 with the traveler 68. The shutter 14 is normally in a closed state in which the shutter 14 tightly covers the central opening 76.

The shutter 112 is part of a shutter mechanism 114 that includes a shutter release 116 that is mounted to the frame 20. The shutter release 116 is releasable by the user to momentarily open the shutter 112. A single leaf impact shutter is shown that pivots, relative to the traveler 68, between a closed position, in which the central opening 76 is blocked, and an open position, in which the central opening 76 is opened.

The shutter 14 is driven by a shutter drive lever 118. The shutter drive lever 118 is charged by the film transport 34 to a charged state. Digital cameras can use the same shutter driven by a simpler mechanism or can use another mechanical shutter or can use internal electronics of the imager and control system that act as a shutter, depending upon the imager used.

The film transport 34 includes a combined thumbwheel and metering wheel 120 that is mounted for rotation adjacent a top corner of the frame 20. A portion of the wheel 120 extends beyond the rear cover 18 and is accessible to the camera operator. If desired, rather than being driven directly by the user, the wheel 120 can be driven by a winding knob, lever, electric motor or other like device.

Photographic film 122 is initially wound in a coil in one film chamber (not shown) and extends across the capture plane (indicated by arrow 121 in FIG. 41) to another film chamber (not shown), in which an end of the film 122 is held by the spool 124 of a film cartridge 76. The wheel 120 has a key (not shown) that couples the wheel 120 to the film cartridge spool 124, such that forward rotation of the wheel 120 causes the film 122 to be wound into the cartridge 76 and advanced past the capture plane 121. An anti-backup pawl 126 is resiliently biased against an edge of the wheel 120 to prevent rotation in a reverse direction.

A film metering sprocket 128 has a sprocket shaft 130 that is pivotably supported by the frame 20. The sprocket 128 engages perforations in the film 70 and is rotated through a complete revolution each time the film 70 is advanced by a distance corresponding to one film frame.

An actuator disk 132 and a charging cam 134 are made in one piece with the sprocket 128 or are assembled with the sprocket 128 so as to remain in fixed (immobile) relation. The actuator disk 132 has a otherwise continuous circumference interrupted by a notch 136. The charging cam 134 has a spiral surface on one side.

A film metering lever 144 is supported for pivotal movement by the frame 20. The metering lever 144 is biased by a coil spring 146 in an activating direction. The metering lever 144 has a first arm 148 ending in a tooth and a second arm 150 having a pawl. When the toothed arm 148 of the metering lever 144 is received in the notch 136 of the actuator disk 132, the pawl arm 150 of the metering lever 144 engages the toothed rim of the wheel 120 temporarily blocking advancement of the film 122.

The shutter release 116 includes a shutter button 138 that is located near the cantilevered end of a flexible arm 140 of the shutter release 116. Adjacent the shutter button 138 the arm 140 has a vertical tab that carries a latch member 142.

The shutter drive lever 118 is biased by a spring 152. The shutter drive lever 118 has a tongue 154 that is engaged by the latch member 142 to hold the shutter drive lever 118 in a charged state in opposition to the spring 152. The shutter drive lever 118 also has a cam follower finger 154 that is positioned so as engage the charging cam 134 of the film transport 34.

A pair of tie bars 156,158 extend outward from the frame 20. The first tie bar 156 is united with the shutter drive lever 116, preferably the bar 156 and lever 116 are different portions of a one-piece casting. The tie bars 156,158 each have opposed first and second ends. The first ends are spaced apart from each other and are each pivotably joined to the frame 20. A parallel bar 164 is pivotably joined to the second ends of the two tie bars 156,158. The parallel bar 164 is spaced forward from the first ends and, can also be spaced forward from the frame 20. A striker 166 is movable with and, preferably, joined to the parallel bar 164. The striker can be modified to telescope as the traveler moves, if desired.

When the shutter drive lever 118 is in the charged state and the camera 10 is in condition to make an exposure, as shown in FIG. 41, the tongue of the shutter drive lever 118 is engaged by the latch member 142, which holds the shutter drive lever 118 in the charged condition in opposition to the spring 152. Prior to this, during film advance, the sprocket 128 has been rotated into a position in which the toothed arm 148 of the metering lever 144 is in the notch 136 of the actuator disk 132. This allows the metering pawl arm 150 to engage the wheel 120 under the influence of the spring. The cam follower finger of the shutter drive lever 118 is out of contact with the charging cam 134.

When the photographer depresses the shutter button 138 to initiate an exposure, the shutter release 116 is released from a ready state to a released state. The shutter button 138 moves the latch member 142 out of engagement with the tongue of the shutter drive lever 118, the shutter drive lever 118 is pivoted rapidly by the spring from the charged state to the discharged state. This causes the striker to impact a tang 168 of the shutter 112, causing the shutter 112 to rotate from a closed state to an open state. The tang 168 is on an extension 170 of the shutter 112 that extends in a direction parallel to the optical axis 38 from the remainder of the shutter. The extension 170 provides for an overlap of the tang 168 and striker 166 when the traveler 68 is in the extended and retracted positions. The impacting of the tang 168 moves the shutter 112 away from the aperture exposing a light image on the capture plane. The aperture is uncovered momentarily. When the striker moves past the tang 168 of the shutter 112, the shutter 112 returns to a closed state under the biasing of a shutter return spring 169.

After the film exposure has been completed, the shutter drive lever 118 moves into engagement with a downwardly extending yoke 173 of the metering lever 144. This causes the metering lever 144 to rotate to a deactivated position, by overpowering the weaker force exerted on the metering member by spring 146. Accordingly, the metering pawl arm 150 is disengaged from the wheel 120 and the metering member tooth arm 148 is retracted from the actuator disc notch 136. This allows the transport mechanism 34 to be operated to advance the film 122 to the next available frame.

When the photographer next rotates the wheel 120 forward, the film 122 is wound onto the spool 124. This causes the metering sprocket 128 to rotate in the same direction. The charging cam 134 engages the finger 171 of the shutter drive lever 118 and rotates the latter back to a charged state.

A great variety of other suitable shutter mechanisms are well-known to those of skill in the art and are commonly used in currently available cameras.

Referring now to FIGS. 4, 8–10, and 13–19, the turret 96 has opposed front and rear surfaces 172,174. The rear lens element or elements 108,110 are disposed against the rear surface 174. The shutter 112 closely adjoins the front surface 172. The turret 96 pivots against a set of standoffs 179. Each standoff is part of the crosswall 74 of the traveler 68. The standoffs 179 provide space between the crosswall 74 and turret 96 for movement of the shutter 112. The shutter closely adjoins the crosswall 74 and front surface 174 of the turret 96 and can contact one or both. The standoffs are configured so as to support the traveler, without excessive friction. In the embodiment shown, the standoffs 179 include a rib 176 and two or more nubs 181 (best seen in FIG. 19).

A backer 178 is joined to the traveler 68. The backer 178 moves with the traveler 68 relative to the support 24. The turret 96 is trapped between the backer 178 and the crosswall 74 of the traveler 68. The backer 178 is advantageous for one-time-use cameras, in which in the lens module 22 may be separated from the remainder of the camera 10, during recycling, since the backer 178 helps protect the turret 96 against damage.

Referring now to FIGS. 5–10 and 16–19, the turret 96 has a cam follower 180 that extends into a cam slot 184 and moves along the cam slot 184 between opposed ends 186, 188. The turret 96 pivots to the first position when the cam follower 180 moves to the first end 186 of the cam slot 184. The turret 96 pivots to the second position when the cam follower 180 moves to the second end 188 of the cam slot 184.

The pivoting of the turret 96 is mechanically synchronized with the axial movements of the traveler 68, such that the lens barrel 50 is in a first configuration, when the cam follower 180 is disposed in the first end 186, and a second configuration, when the cam follower 180 is disposed in the second end 188. The traveler 68 is in the retracted position in the first configuration, and the extended position in the second.

In particular embodiments of the invention, the support 24 has a forwardly extending cam finger 190, which has a first cam surface 192. The guide 28 has a cam notch 194 that receives the cam finger 190. The cam notch 194 has a second cam surface 196. The first cam surface 192 is inclined relative to an imaginary line parallel to the optical axis 38. The second cam surface 196 is parallel to and spaced from the first cam surface 192. The cam surfaces 192,196 together define the cam slot 184 and first and second opposed ends 186,188. The provision of the first and second cam surfaces 192,196 on a support 24 and guide 28 that are separate pieces joined together is advantageous for simplifying the molding of the support 24 as a one-piece plastic casting and the guide 28 as another one-piece plastic casting.

Referring now mainly to FIGS. 20–23, the biaser 94 urges the first contact surface 58 toward the front rest 54, when the lens barrel 50 is in the extended position, and urges the second contact surface 60 toward the rear rest 56, when the lens barrel 50 is in the retracted position. It is preferred that the biaser 94 also urges the lens barrel 50 away from the intermediate positions and toward the nearer of the extended and retracted positions. The biaser 94 also acts on the turret 96, directly or indirectly, and urges the cam follower 180 of the turret 96 toward the first and second ends 186,188 of the cam slot 184 and away from a continuum of intermediate position between the ends 186,188 of the cam slot 184. As earlier noted, this is in coordination with movement of the traveler 68.

The biaser 94 includes one or more coordinated over-center mechanisms. It is highly preferred that the over-center mechanism or mechanisms driving the lens barrel 50 provide a high degree of biasing and a rapid turnover between a first state, in which biasing is in a forward direction, and a second state, in which biasing is in a reverse direction. An increase in biasing up to the time of turnover is preferred.

Referring now to FIGS. 16–19 in particular embodiments, the biaser 94 includes a turret spring 197 that biases the turret 96 into the first and second positions shown, for one embodiment, in FIGS. 8 and 17, and 10 and 18, respectively. The turret spring 197 biases the turret 96 away from intermediate positions like the one shown in FIG. 9. The turret spring 197 also continuously biases the turret 96 against said traveler 68. In the embodiment shown in FIGS. 16–19, the turret spring 197 has a first end 199 that bears on the turret 96. A second end 195 is attached to the crosswall 74 of the traveler 68 and is bifurcated to provide space for the cam follower 180.

In the embodiment shown in FIGS. 11–12, the biaser 94 has an over-center mechanism 198 that has a link 202 pivotably joined at an inner end 209 to the support 24. The support 24 has a post 206. The link 202 has a hole that fits over the post 206. The other end 211 of the link 202 is slidably joined to the traveler 68. The traveler 68 has an upwardly extending post 208. The outer end 211 of the link 202 has an opening 210 shaped like a long oval, but having a slight dogleg at an inner end 212 of the opening 210. The post 208 is movable along the opening 210 between the inner end 212 and an outer end 214.

In this embodiment, the support 24 has a flange 216 that protrudes forward from the remainder of the support 24, between the two ends 205,206 of the link 202. The over-center mechanism 198 has an over-center spring 200 having a loop at either end. A first loop is a joined to the flange 216. The second loop is joined to the link 202 between the two ends 209,211 of the link 202. The over-center spring 200 is characterized by rapid turnover and an increase in biasing up to turnover.

The link 202 is movable between a retracted position and an extended position, in tandem with the movement of the lens barrel 50, between respective retracted and extended positions. The flange 216, to which the over-center spring 200 is attached, is forward of the centerline of the link 202, in the retracted position and rearward of the centerline of the link 202 in the extended position. During the movement between the retracted and extended positions, the post 208 of the traveler 68 moves along the opening 210 between the two ends 205,206. The over-center mechanism 198 is switched between retracted and extended positions by rotating the lens barrel 50 directly or indirectly via a mechanically coupled part.

Referring now to FIGS. 8–10 and 17–32, in other embodiments, the biaser 94 also includes an over-center spring 200 having a loop 201,203 at each end. One of the loops 201 is joined to the twist ring 66. The other loop 203 is joined to a boss 29 that is part of the support 24 or frame 20. The loops are held 110 by knobs 205,207 that each extend outward from a respective part. The knobs 205,207 can have notches or the like (not shown) to help hold the loops 201,203. The spring 200 held by the support 24 can, alternatively, be joined to the frame 20 or another non-moving part.

The over-center spring 200 is part of a deployment mechanism 218. The deployment mechanism 218 has an actuator 220 having a grip 222 and a slide 224. The grip 222 is accessible from the outside of the body and can include a raised handhold (as shown) and/or one or more features for easier manipulation by the user, such as knurling or other texturing. The grip 222 is movable back and forth within a recess 226 in the front cover 16. The grip 222 has a connector 228 that protrudes through an opening 230 in the recess 226. The opening 230 can be centered within the recess 226 and is fully overlapped by the grip 222. This provides light locking. The travel of the grip 222 is limited by the length of the recess 226. Travel can be limited by the length of the opening 230 within the recess 226, but this may be esthetically unappealing, in that the fit of the grip 222 in the cover 16 may look sloppy to the user.

The actuator 220 is disposed against an actuator base 232 that adjoins the guide 28 of the lens module 22. The actuator base 232 can be part of the frame 20, or a separate piece, or integral with the guide 28 or mount 26 of the support 24. For example, the actuator base 232 and guide 28 can be parts of a one-piece plastic casting. This is convenient in that the alignment of the deployment apparatus with the lens barrel 50 is, to a large extent, a function of the physical positioning of the actuator base 232 alongside the guide 28. In particular embodiments, the guide 28 is hooked to the mount 26 and the actuator base 232 and mount 26 are both hooked to the frame 20 to reduce the risk of flexure of one part relative to another during use.

The slide 224 of the actuator 220 rests against the actuator base 232 and is movable reciprocally on the actuator base 232. The slide 224 can have a stepped shape (see FIG. 28), in which a lower step 236 rides in a trough 238 in the actuator base 232. A rib 240 extends outward from the lower step 236. The rib 240 extends transverse to the direction of movement of the actuator 220. The rib 240 has a pair of opposed faces 239,241. A transition 242 adjoins the lower step 236 and slopes upward to an upper step 244. The upper step 244 rides against a shelf 246 of the actuator base 232. The shelf 246 and trough 238 are flat where the slide 224 is in contact, but could be modified to reduce friction. The region 247 of the actuator base 232 between the trough 238 and the shelf 246 is cutaway to provide clearance for the transition 242.

The actuator base 232 includes a pair of flanges 248,250. (See FIGS. 26–28.) The first flange 248 overlaps a groove 252 adjoining the trough 238 in the actuator base 232. A similar groove 254 adjoins the sloped region 247 of the actuator base 232. The second flange 250 overlaps the second groove 254. The lower step 236 of the slide 224 has a tang 256 that is shaped so as to fit in first groove 252. The upper step of the slide 224 has a similar tang 257 that fits in the second groove 254. The ends of the trough 238 is open and the slide 224 can flex slightly. This allows the slide 224 to be slid under the flanges 248,250 during assembly of the camera 10.

A pawl-arm 258 has a flexible arm 260 that terminates in a pawl 262. The pawl-arm 258 is joined to the upper step 244 of the slide 224. A detent rib 264 protrudes outward from the actuator base 232. The pawl-arm 258 rides against the detent rib 264 and resiliently biases the actuator 220 toward the primary and secondary positions and away from intermediate positions between the primary and secondary positions. The pawl-arm 258 and detent rib 264 together provide an actuator over-center mechanism 198a. This over-center mechanism 198a acts in concert with a second or drive over-center mechanism 198b that includes the over-center spring 200.

The upper step 244 of the slide 224 has a fitting 266 that receives the connector 228 of the grip 222. In the embodiment shown, the grip 222 is snap fit into a hole in the upper step of the slide 224. This is convenient, because the grip 222 is held in place without the use of additional parts and the camera 10 is easy to assemble. Alternative approaches for attaching parts are well-known to those of skill in the art.

The actuator base 232 has an outwardly extending post 268 and a drive unit seat 270. The drive unit seat 270 and post 268 are offset from each other. A drive unit 272 is seated in the drive unit seat 270 and is pivotable about a drive axis 274 (shown in FIG. 20) that extends through the seat 270. The drive unit 272 and drive unit seat 270 can fit in the manner of a hub and axle; however, it is convenient to provide a snap fit, in which the drive unit seat 270 is a rimmed hole and the drive unit has a snap connector 273, as shown in some of the figures.

The drive unit 272 has a gear wheel 276 having circumferential teeth. A post 277 extends upward near the periphery of the gear wheel 276. The drive unit 272 has a pair of downwardly extending stops 278,280 that extend downward from the gear wheel 276, near the periphery of the gear wheel 276. The post 268 and stops 278,280 can be radially positioned differently, but the peripheral position shown maximizes drive unit 272 movement, for a given gear wheel size. The posts 268 and stops 278,280 can be moved further out radially on extensions (not shown), but this may complicate assembly of the device. The gear wheel 276 overlaps the slide 224. This reduces space requirements of the deployment apparatus 218.

The stops 278,280 extend downward from the gear wheel 276, to an extent that the stops 278,280 can interfere with the rib 240 during movement of the actuator 220. The stops 278,280 are spaced apart from each other. This separation can be varied but is, desirably, greater than 180 degrees in the directions of travel of the drive unit 272 (discussed in detail below). In the deployment apparatus shown in FIGS. 20–32, this separation of the stops is 270 degrees in the direction of movement of the drive unit 272. Angles of less than 180 degrees can be used, but for a given travel of a deployable component, require use of a larger gear wheel 276. This decreases the compactness that is a benefit of the deployment apparatus 218 described here.

In use, the gear wheel 276 does not have to have a complete circle of teeth. For example, in the embodiment of FIGS. 20–32, the teeth in the 90 degree arc between the two stops 278,280 are non-functional could be eliminated. A complete circle of teeth, although non-functional in the finished device, can be beneficial during assembly, since the drive unit 272 can be put in place in a random orientation and can then be rotated in either direction until a correct orientation is reached. The deployable component 218 is then assembled with the drive unit 272 after the correct orientation has been reached.

The twist ring 66 is toothed to match the movement of the drive unit 272, that is, the teeth are complementary to the functional teeth of the drive unit 272.

In the embodiment of FIGS. 20–32, the drive over-center mechanism 198b is mounted to the actuator base 232 and the drive unit 272. The drive over-center mechanism 198b has an over-center spring 200 having a loop 201,203 at the end of each of two opposed arms. The first loop 201 is fitted over the post 277 of the drive unit 272. A second loop 203 is fitted over the post 268 of the actuator base 232. The over-center spring 200 biases the drive unit 272, enmeshed twist ring 6, and traveler 68 toward the orientations shown in FIGS. 21 and 22 and away from in-between orientations.

Other types of over-center mechanisms can be used in place of those disclosed here. For example, the pawl-arm 258 and detent rib 264 can be replaced by an over-center spring like the ones illustrated. (Posts can be added to the actuator base 232 and slider 224 to hold respective loops of the over-center spring.)

The switching of the lens barrel 50 between retracted and extended positions begins with the user pushing the grip 222 of the actuator 220. This moves the actuator 220 out of the primary position and toward the secondary position. While the actuator 220 moves away from the primary position, the first face 239 of the rib 240 of the actuator 220 pushes against the first stop 278 of the drive unit 272. This causes the drive unit 272 to pivot through the first range of intermediate orientations toward the middle orientation. This pivoting is opposed by the actuatore over-center mechanism 198a and the drive over-center mechanism 198b. Movement of the actuator 220 continues until the middle range of conformations is reached. At this point, the biasing by the actuator over-center mechanism 198a changes over to biasing toward the secondary position. This forward biasing by the actuator over-center mechanism 198a is opposite in direction from the continuing biasing by the drive over-center mechanism 198b.

When the middle orientation of the drive unit 272 is reached, the drive over-center mechanism 198b changes over and biases in a forward direction toward pivoting of the drive unit 272 to the second end orientation. At this point, biasing by both over-center mechanisms 198a,198b is in the same direction. The actuator 220 continues to move until the secondary position is reached and the actuator stops moving. The drive unit 272 continues moving forward under the forward biasing of the drive over-center mechanism 198b. The drive unit 272, in the illustrated embodiment, moves independently of the actuator 220 after the middle orientation is reached. This results in the first stop 278 of the drive unit 272 moving away from the first face 239 of the rib 240 of the actuator 220. The biasing of the drive over-center mechanism 198b pivots the drive unit 272 through the second range of intermediate orientations to the second end orientation. The actuator 220 remains in the secondary position. During the continued pivoting of the drive unit 272, the second stop 280 of the drive unit 272 comes around and reaches the second face 241 of the rib 240.

The movement of the lens barrel between positions can be delimited by the stops 278,280 or by both the stops 278,280 and one or two rests or by only rests or features of the support. In the first two cases, the stops 278,280 engage the faces 239,241 of the rib 240 in limit positions. In the latter case, the stops 278,280 are spaced from the rib 240 in the limit positions.

In particular embodiments, the camera 10 has a positioner 62. The positioner 62 is used to delimit the position of one or more lens elements. If the positioner 62 is used to limit travel of a lens barrel 72, the positioner 62 is also referred to herein as a travel stop 62a.

Referring now to FIGS. 8–10 and 33–35, a travel stop 62a is a ring-shaped one-piece plastic casting that has an opening 284 centered on the optical axis 38. The travel stop 62a has an annular main portion 298 and a skid 286 that extends in an axial direction away from the main portion 288. The skid 286 and main portion 288 are located radially outward from the opening 284. The skid 286 is spiraled about the optical axis 38 toward the mount 26. The skid has one or more ramps 290. Each ramp 290 defines a separate spiral about the optical axis 38.

The ramps 290 of the skid 286 of the travel stop 62a are the front rest 54, in this embodiment. The ramps 290 engage the first contact surface 58 of the lens barrel 50 and delimit the extended position of the lens barrel 50 by blocking further forward movement. (See FIG. 34.) In these embodiments, as earlier described, the lens barrel 50 has a main portion 82 disposed in the central passage 40 and a plurality of track followers 80 protruding outwardly from the main portion 82. The first contact surface 58 is a part of one of the posts 84 of each of the track followers 70. Each portion of the first contact surface 58 is relatively small and only contacts a radially aligned segment of the respective ramp 290 in the extended position. The segment is the portion of the ramp in contact with the first contact surface and is thus a small part of the ramp.

In the embodiment shown in FIG. 33, the travel stop 62a also has one or more abutments 294 extending axially outward from the main portion 288 of the travel stop 62a. Each abutment 298 is arcuate and extends partway around the main portion 298. The abutments 294 are spaced from the ramp or ramps 290. Each abutment 294 has one or more contact surfaces 296 that extend along the optical axis 38. The contact surfaces 296 each have a major dimension parallel to the optical axis 38. The number, shape, and spacing of abutments 294 can be varied. For example, in the embodiment shown in FIG. 33, each abutment 294 has a first pair of opposed contact surfaces 296 that face each other at the middle of each abutment and a second pair at the opposed ends of each abutment 294.

In this embodiment, the guide 28 has one or more accessways 297 that extend through the forward rim 44. The accessways 297 are spaced radially outward from the central passage 40. Each accessway 297 is shaped like a segment of a ring and is aligned with a respective abutment 294. The abutments 294 can extend into respective accessways 297, as shown in FIG. 34, or can be recessed from or extend through respective accessways 297. It is currently preferred that abutments 294 extend forward along the optical axis 38 and that the main portion 288 of the travel stop 62a is rearward of the forward rim 44. Abutments 294 can, alternatively, extend radially outward relative to the optical axis 38. The travel stop 62a is mounted to the guide 28 adjoining the forward rim 44. The skid 286 of the travel stop 62a is located internal to the guide 28. The ramps 290 face the mount 26. In the embodiment shown, the skid 286 has three ramps 290 that are spaced from each other, equally spaced about the optical axis 38, and equally inclined toward the mount 26.

The travel stop 62a shown in FIGS. 33–35, has a forward section 300 and an axially inset rear section 302 of the main portion 298. The forward section 300 has a rear-facing shoulder 304. In the assembled lens module 22, the twist ring 66 is trapped between the forward margin 306 of the mount 26 and the shoulder 304 of the travel stop 62a. The travel stop 62a is trapped between the twist ring 66 and the forward rim 44 of the guide 28.

The travel stop 62a is pivotable about the optical axis 38 to a plurality of different orientations of the skid 286 relative to the support 24 and the frame 20. The pivoting shifts the segments of the ramps that are in contact with the first contact surface along the respective ramps. The positioner 62 is pivoted by pushing against one or more of the contact surfaces 296 of the abutments 294. A spanner or other tool (not shown) having one or more blades or pins can be inserted into one or more accessways and placed against the contact surfaces 296. The tool can then be used to push the positioner 62 in one or another direction of rotation about the optical axis 38. The abutments 294 can also be pushed by hand during camera assembly, prior to placement of the front cover.

The pivoting of the travel stop 62a alters the relative radial alignment of the skid 286 and the lens barrel 50. As the travel stop 62a is pivoted, the segments of the ramps 290 in contact with the parts of the respective posts 84 move along the respective ramps 290. This changes the axial location of the first contact surface 58 and the rest of the lens barrel 50, in the extended position. The travel stop 62a is adjusted, during assembly, to correct the lens focus for an individual camera 10. After adjustment, the travel stop 62a can be retained in place by friction between parts, by clamping or other fastening, or by bonding the travel stop 62a in place with adhesive or welding or the like.

In another embodiment shown in FIGS. 36–37 and 45, the abutments 294 of the travel stop 62b are joined together to form a continuous brim that is external to the forward rim 44 of the guide 28. The travel stop 62b is held in place by an overlap of the forward rim 44 and an inner margin 330 of the traveler 62b. The travel stop 62b is otherwise like those earlier described.

A rear travel stop (not shown) can be provided in addition to or in place of the front travel stop 62a The rear stop is mounted to the guide 28 opposite the travel stop 62a and delimits the location of the lens barrel 50 in the retracted position. The rear travel stop has a skid 286 that faces the forward rim 44 of the guide 28. The skid 286 and other features are otherwise like those earlier discussed.

In particular embodiments a coverglass 310 is used, in place of a tool, to adjust the travel stop 62a or other positioner 62. Referring to FIGS. 33, 36–37, and 45, the coverglass 310 has a window 312 that is transparent or filtering.

The coverglass 310 has a reinforcement band 314 that supports the window 312 and can provide reinforcement against impacts. An adjuster 316 is joined to the reinforcement band 314. The adjuster 316 has one or more lugs 318 that extend toward the mount 26. In a particular embodiment, the window 312 is curved and has no optical power.

The coverglass 310 is mounted to the forward rim 44 of the guide 28 (see FIG. 33) or is mounted to the travel stop 62a (see FIGS. 36–37 and 45). The window 312 is aligned with the central passage 40 of the support 24. The lugs 318 are positioned so as to engage the contact surfaces 296 at the middles of the abutments 294 of the travel stop 62a. (See FIG. 33) The band 314 engages the outer edges 308 of the abutments 294. In the embodiment shown in FIG. 33, the lugs 318 extend into the accessway 297. (See FIGS. 33–34.) The coverglass 310 can be a one-piece plastic casting.

The coverglass 310 is, at least initially, pivotable about the optical axis 38 relative to the support 24. When the coverglass 310 is rotated, the lugs 318 push the travel stop 62a, pivoting the travel stop 62a about the optical axis 38.

Referring now to FIGS. 38–40, in particular embodiments of the invention, a positioner 62b is used with a lens that does not travel. In this camera 110, the lens barrel 50 is replaced by a front lens holder 320. A front lens 322 is held in the front lens holder 320. A rear lens 326 is held in a rear lens holder 328. The position of the front lens holder 320 is adjusted along the optical axis 38, relative to the rear lens 326, to provide focus adjustment at a single position along the optical axis 38. This can be a factory adjustment that remains unchanged after the camera is assembled or can be adjustable by the user.

The front lens holder 320 has contact surfaces 324 that are pivoted against the ramps 290 of the skid 286 to relocate the front lens 322 along the optical axis 38, in the same manner as earlier described for the travel stop 62a. The coverglass 310 functions in the same manner as in the previous embodiment. The coverglass 310 is mounted to the front cover 16 and can be pivoted about the optical axis 38 with lugs 318 of the coverglass 310 in contact with contact surfaces 296 of abutments 294 of the lens holder 320 to rotate the lens holder 320 about the optical axis 38. In the embodiments of FIGS. 38–40, the abutments 294 extend out radially relative to the optical axis and are joined together into a continuous ring.

The invention has been described in detail with particular reference to certain preferred embodiments thereof, but it will be understood that variations and modifications can be effected within the spirit and scope of the invention.

What is claimed is:

1. A camera assembly comprising:
    a support defining an optical axis;
    a traveler being reversibly movable along said optical axis, relative to said support, from a retracted position, through a plurality of intermediate positions, to an extended position, said traveler having opposed first and second contact surfaces;
    a guide extending outward from said support, said guide having a forward rest facing said first contact surface and a rear rest facing said second contact surface, said rests each being aligned with said optical axis;
    a twist ring, disposed on said guide, said twist ring being rotatable relative to said guide about said optical axis and having a cam surface engaging a cam follower of said traveler; and
    a biaser biasing said traveler against said rear rest, when said traveler is in said retracted position, and against said forward rest, when said traveler is in said extended position, said biaser being spaced from said rests and said contact surfaces and being joined to said twist ring.

2. The camera assembly of claim 1 wherein said guide blocks rotation of said traveler and blocks axial displacement of said twist ring.

3. The camera assembly of claim 1 wherein said biaser is an over-center mechanism and biases said traveler away from said intermediate positions.

4. The camera assembly of claim 1 wherein said guide retains said traveler in close alignment with said optical axis in said retracted and extended positions, and retains said traveler in more approximate alignment with said optical axis in said intermediate positions.

5. The camera assembly of claim 1 where in said first contact surface is in three-point contact with said forward rest when said traveler is in said extended position and said second contact surface is in three-point contact with said rear rest when said traveler is in said retracted position.

6. The camera assembly of claim 1 wherein said traveler is pivotable relative to said guide in said intermediate positions.

7. The camera assembly of claim 6 wherein said guide loosely blocks rotation of said traveler about said optical axis.

8. The camera assembly of claim 1 wherein said guide encircles said traveler.

9. The camera assembly of claim 1 wherein said traveler is held in alignment with said optical axis on ly in said extended and retracted positions.

10. The camera assembly of claim 1 wherein said traveler is held in close alignment with said optical axis in said retracted and extended positions and is loosely constrained, in more approximate alignment with said optical axis, in said intermediate positions.

11. The camera assembly of claim 1 further comprising a lens element supported in said traveler.

12. The camera assembly of claim 1 wherein said traveler is disposed fully within said guide in all of said positions.

13. The camera assembly of claim 1 wherein said support, said traveler, and said guide are each a one-piece plastic casting.

14. A camera assembly comprising:
  a support defining an optical axis;
  a guide extending outward from said support along said optical axis, said guide having a forward rest and a rear rest and a central passage bordered by said rests;
  a twist ring disposed on said guide, said twist ring being rotatable relative to said guide about said optical axis, said twist ring having a cam surface;
  a traveler disposed in said central passage, said traveler having a cam follower engaging said cam surface, said traveler being reversibly movable along said optical axis, relative to said guide, from a retracted position, through a plurality of intermediate positions, to an extended position, said traveler having a first contact surface facing said forward rest and a second contact surface facing said rear rest, said first contact surface contacting said forward rest when said traveler is in said extended position, said second contact surface contacting said rear rest when said traveler is in said retracted position;
  an over-center mechanism joined to said twist ring, said over-center mechanism biasing said traveler against said rear rest, when said traveler is in said retracted position, and against said forward rest, when said traveler is in said extended position, said over-center mechanism biasing said traveler away from said intermediate positions.

15. The camera assembly of claim 14 wherein said guide firmly holds said traveler in close alignment with said optical axis in said retracted and extended positions, and said guide loosely retains said traveler in approximate alignment with said optical axis in said intermediate positions.

16. The camera assembly of claim 14 wherein said first contact surface is in three-point contact with said forward rest when said traveler is in said extended position and said second contact surface is in three-point contact with said rear rest when said traveler is in said retracted position.

17. A camera comprising:
  a support defining an optical axis;
  a traveler reversibly movable along said optical axis, relative to said support, from a retracted position, through a plurality of intermediate positions, to an extended position, said traveler having opposed first and second contact surfaces;
  a guide encircling said traveler, said guide extending outward from said support, said guide loosely blocking rotation of said traveler about said optical axis, said guide having a forward rest facing said first contact surface and a rear rest facing said second contact surface, said rests each being aligned with said optical axis, said first contact surface being in three-point contact with said forward rest when said traveler is in said extended position, said second contact surface being in three-point contact with said rear rest when said traveler is in said retracted position; and
  an over-center mechanism including a link pivotably joined to said support and slideably joined to said traveler, and an over-center spring joined to said support and said link, said over-center mechanism biasing said second contact surface against said second rest, when when said traveler is in said retracted position, biasing said first contact surface against said first rest, when said traveler is in said extended position, and biasing said traveler away from said intermediate positions.

18. The camera of claim 17 wherein said guide firmly holds said traveler in close alignment with said optical axis in said retracted and extended positions, and said guide loosely retains said traveler in approximate alignment with said optical axis in said intermediate positions.

19. A camera comprising:
  a support defining an optical axis;
  a traveler reversibly movable along said optical axis, relative to said support, from a retracted position, through a plurality of intermediate positions, to an extended position, said traveler having opposed first and second contact surfaces;
  a guide encircling said traveler, said guide extending outward from said support, said guide loosely blocking rotation of said traveler about said optical axis, said guide having forward rest facing said first contact surface and a rear rest facing said second contact surface, said rests each being aligned with said optical axis, said first contact surface being in three-point contact with said forward rest when said traveler is in said extended position, said second contact surface being in three-point contact with said rear rest when said traveler is in said retracted position; and
  a twist ring disposed on said guide, said twist ring being rotatable relative to said guide about said optical axis, and having a cam surface engaging a cam follower of said traveler; and
  said guide blocks rotation of said cam follower a nd blocks axial displacement of said twist ring.

20. The camera of claim 19 wherein said over center mechanism is joined to said twist ring and spaced from said traveler.

21. A camera assembly comprising:
  a support defining an optical axis;
  a traveler being reversibly movable along said optical axis, relative to said support, between a retracted position and an extended position, said traveler having opposed first and second contact surfaces;
  a guide extending outward from said support, said guide having a first rest facing said first contact surface and a second rest facing said second contact surface;
  a biaser biasing said traveler against said second rest, when said traveler is in said retracted position, and against said first rest, when said traveler is in said extended position; and
  a twist ring disposed on said guide and being rotatable rotatable relative to said guide about said optical axis to move said traveler between said retracted and extended positions, said twist ring having a cam surface engaging a cam follower of said traveler.

22. A camera assembly as recited in claim 21 wherein said biaser is joined to said twist ring.

23. A camera assembly as recited in claim 21 wherein said guide completely encircles said traveler.

24. A camera assembly comprising:

a support defining an optical axis;

a traveler reversibly movable along said optical axis, relative to said support, between a retracted position and an extended position;

a twist ring rotatable relative to said guide about said optical axis, said twist ring having a cam surface engaging a cam follower of said traveler; and a guide completely encircling said traveler, said guide blocking rotation of said cam follower and blocking axial displacement of said twist ring;

wherein said traveler is in three-point contact with said guide in said extended position and in said retracted position.

25. A camera assembly comprising:

a support defining an optical axis;

a traveler reversibly movable along said optical axis, relative to said support, between a retracted position and an extended position, said traveler having opposed first and second contact surfaces;

a guide completely encircling said traveler, said guide having a first rest facing said first contact surface and a second rest facing said second contact surface, said first contact surface being in three-point contact with said first rest when said traveler is in said extended position, said second contact surface being in three-point contact with said second rest when said traveler is in said retracted position; and an over-center mechanism including a link pivotably joined to said support and slideably joined to said traveler, and an over-center spring joined to said support and said link, for biasing said second contact surface against said second rest when when said traveler is in said retracted position, and for biasing said first contact surface against said first rest when said traveler is in said extended position.

26. A camera assembly as recited in claim 25 wherein said traveler is reversibly movable along said optical axis through at least one intermediate position to said retracted and extended positions, and said over-center mechanism biases said traveler from said at least one intermediate position.

27. A camera assembly comprising:

a support defining an optical axis;

a traveler being reversibly movable along said optical axis, relative to said support, from a retracted position, through at least one intermediate positions, to an extended position, said traveler having opposed first and second contact surfaces;

a guide configured so that said traveler is completely within said guide in said extended, retracted and at least one intermediate positions, said guide having a forward rest facing said first contact surface and a rear rest facing said second contact surface; and a biaser biasing said traveler against said rear rest, when said traveler is in said retracted position, and against said forward rest, when said traveler is in said extended position.

28. A camera assembly comprising:

a support defining an optical axis;

a traveler being reversibly movable along said optical axis, relative to said support, between a retracted position and an extended position, said traveler having opposed first and second contact surfaces;

a non-rotatable guide extending outward from said support and completely encircling said traveler, said guide having a first rest facing said first contact surface and a second facing said second contact surface; and a biaser biasing said traveler against said rear rest, when said traveler is in said retracted position, and against said forward rest, when said traveler is in said extended position.

29. A camera assembly as recited in claim 28 further comprising a twist ring disposed on said guide, said twist ring being rotatable relative to said guide about said optical axis and having a cam surface engaging a cam follower of said traveler to move said traveler along said optical axis.

* * * * *